US009917379B2

(12) United States Patent
Pernot et al.

(10) Patent No.: US 9,917,379 B2
(45) Date of Patent: Mar. 13, 2018

(54) COUPLER FOR ATTACHING A CONDUIT TO A WALL

(71) Applicant: Cooper Technologies Company, Houston, TX (US)

(72) Inventors: Matthew Thomas Pernot, Kirkville, NY (US); Joseph Edward Platt, Baldwinsville, NY (US); Eric Perry Cheney, Marcellus, NY (US); Andrew F. Scarlata, West Monroe, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/484,824

(22) Filed: Apr. 11, 2017

(65) Prior Publication Data

US 2017/0294723 A1 Oct. 12, 2017

Related U.S. Application Data

(60) Provisional application No. 62/321,374, filed on Apr. 12, 2016.

(51) Int. Cl.

| | |
|---|---|
| ***H01R 4/64*** | (2006.01) |
| ***H01R 4/38*** | (2006.01) |
| ***H01R 4/36*** | (2006.01) |
| ***H01R 4/60*** | (2006.01) |
| ***H02G 3/06*** | (2006.01) |

(52) U.S. Cl.

CPC ............ *H01R 4/646* (2013.01); *H01R 4/363* (2013.01); *H01R 4/38* (2013.01); *H01R 4/60* (2013.01); *H02G 3/0683* (2013.01)

(58) Field of Classification Search

CPC .... H02G 3/0683; H02G 3/0616; H02G 3/083; B60R 16/0222; H01R 4/64; H01R 13/65802; H01R 13/648

USPC ........................ 174/650–669; 439/92, 95–97

See application file for complete search history.

(56) References Cited

U.S. PATENT DOCUMENTS 3,104,120 A 9/1963 Myers
4,090,029 A * 5/1978 Lundeberg ........... H02G 3/0616 174/51
5,374,785 A 12/1994 Bedkowski et al.
5,827,078 A * 10/1998 Simonian ........... H01R 13/6593 439/939

(Continued)

FOREIGN PATENT DOCUMENTS

WO 99/37005 A1 7/1999

OTHER PUBLICATIONS

International Search Report and Written Opinion for Application No. PCT/US2017/027198 dated Jul. 20, 2017.

*Primary Examiner* — Gary Paumen
(74) *Attorney, Agent, or Firm* — Merchant & Gould P.C.

(57) ABSTRACT

The present disclosure relates to a conduit coupler including a hub and a lock nut that thread on the hub. In one example, the lock nut includes a ground connection location including a linear wire retention slot. The ground wire can be retained in the linear wire retention slot by a grounding bracket secured at the ground connection location by a grounding screw. The grounding bracket can be captive relative to the grounding screw. The grounding bracket can include integrated spring washer functionality. The ground connection location can be provided on a tower of the lock nut.

20 Claims, 31 Drawing Sheets

(56) References Cited

U.S. PATENT DOCUMENTS

| | | | | |
|---|---|---|---|---|
| 7,488,905 | B2 * | 2/2009 | Kiely | H01R 13/745 174/650 |
| 7,635,816 | B1 * | 12/2009 | Shemtov | H02G 3/0666 16/2.2 |
| 7,952,034 | B2 * | 5/2011 | Kiely | H02G 3/0683 174/650 |
| 8,410,378 | B1 * | 4/2013 | Senseney | H02G 3/0616 174/650 |
| 8,466,378 | B1 * | 6/2013 | Gretz | H02G 3/0616 174/552 |
| 8,979,557 | B2 * | 3/2015 | Dinh | H02G 3/0691 174/78 |
| 2007/0001083 | A1 | 1/2007 | Martin et al. | |
| 2010/0263925 | A1 | 10/2010 | Spahic | |
| 2013/0118802 | A1 | 5/2013 | Dinh | |
| 2013/0133943 | A1 * | 5/2013 | Smith | H01R 4/64 174/665 |
| 2015/0340776 | A1 | 11/2015 | Brown | |
| 2016/0020533 | A1 | 1/2016 | Montena | |

* cited by examiner

COUPLER FOR ATTACHING A CONDUIT TO A WALL

CROSS-REFERENCE TO RELATED APPLICATION

This application claims the benefit of U.S. Provisional Patent Application No. 62/321,374, filed Apr. 12, 2016, which application is hereby incorporated by reference in its entirety.

TECHNICAL FIELD

The present invention relates generally to a coupler for attaching a conduit such as an electrical conduit to a wall of an enclosure such as a junction box.

BACKGROUND

It is a common practice to use a coupler to secure a conduit to an enclosure. Often, the conduit is an electrical conduit and the enclosure is an electrical enclosure such as a junction box. The electrical conduit can be used to facilitate routing electrical wire in and out of the electrical enclosure. In certain examples, the electrical closure can be an explosion-proof enclosure.

A typical coupler can include a hub and a lock nut adapted to mount on the hub. The hub can form a hollow sleeve having a first end portion with internal threads and a second end portion with external threads. The hub can also include a flange positioned between the first and second end portions. In use, the coupler is mounted at an opening defined through a wall of an enclosure. The hub is mounted outside the enclosure with the second end portion of the hub extending through the enclosure opening and the flange opposing the wall of the enclosure. A seal can be compressed between the flange and the wall of the enclosure to provide environmental sealing. The lock nut is positioned inside the enclosure and is threaded on the second end portion of the hub to lock the hub in place at the enclosure opening. A conduit such as an electrical conduit can be threaded within the first end portion of the hub to attach the conduit to the coupler. In certain examples, the lock nut can include one or more ground connection locations for connecting a ground wire to the coupler to provide grounding of the conduit and/or the enclosure. Example patents that disclose conduit couplers include U.S. Pat. No. 3,104,120 and U.S. Pat. No. 5,374,785.

Ease of installation is an important consideration for conduit couplers. Hence features that allow a technician to efficiently install and ground a conduit coupler at a given location are desirable.

SUMMARY

One aspect of the present disclosure relates to a conduit coupler including a hub and a lock nut adapted to mount on the hub. In certain examples, the lock nut can include a ground connection location configured to allow a technician to quickly and efficiently connect a ground wire to the lock nut in the field. In certain examples, the lock nut can include a wire retention feature that allows a ground wire to be axially inserted (e.g., “stabbed” in a linear motion) into the wire retention feature. In one example, the wire retention feature can be configured to receive a ground wire horizontally relative to the lock nut. In another example, the wire retention feature can be configured to receive a ground wire vertically relative to the lock nut. In certain examples, the wire retention feature can include a linear slot or groove configured to receive and retain a straight portion of a ground wire.

Another aspect of the present disclosure relates to a coupler having a lock nut including a ground connection location capable of accommodating both a ground wire having a straight end and a ground wire having a hooked/bent end. In this way, the ground connection location can be used by technicians that prefer electrically connecting a ground wire by inserting a straight end of the ground wire linearly into a slot and/or by technicians that prefer electrically connecting a ground wire by bending an end of the ground wire into a hook and positioning the hooked end around a grounding screw.

A further aspect of the present disclosure relates to a coupler having a lock nut including a ground connection location having a grounding screw opening that receives a grounding screw on which a grounding bracket is mounted. In certain examples, the ground connection location can include at least one linear slot in which a straight end of the ground wire is retained by the grounding bracket. In certain examples, the grounding bracket is held captive relative to the grounding screw so as to facilitate installation and to prevent loss of parts. In certain examples, the grounding bracket can include integrated lock-washer functionality. In certain examples, the integrated lock-washer functionality can include at least one cantilever spring (i.e., leaf spring) that elastically flexes when the grounding bracket is secured at the ground connection location by the grounding screw so as to apply axial load to the threads of the grounding screw. This axial load on the threads inhibits grounding screw from unintentionally unthreading from the grounding screw opening.

Still another aspect of the present disclosure relates to a coupler having a lock nut including a ground connection location provided on a tower to facilitate access to the ground connection location. In certain examples, a plurality of the ground locations can be provided on separate towers spaced about a circumference of the lock nut so as to provide essentially 360° axis to the ground connection locations. In certain examples, the coupler has a configuration compatible with pertinent requirements or standards (e.g., the coupler can be compatible with ATEX compliance requirements).

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventions and inventive concepts upon which the examples disclosed herein are based.

DETAILED DESCRIPTION

Figure 1:
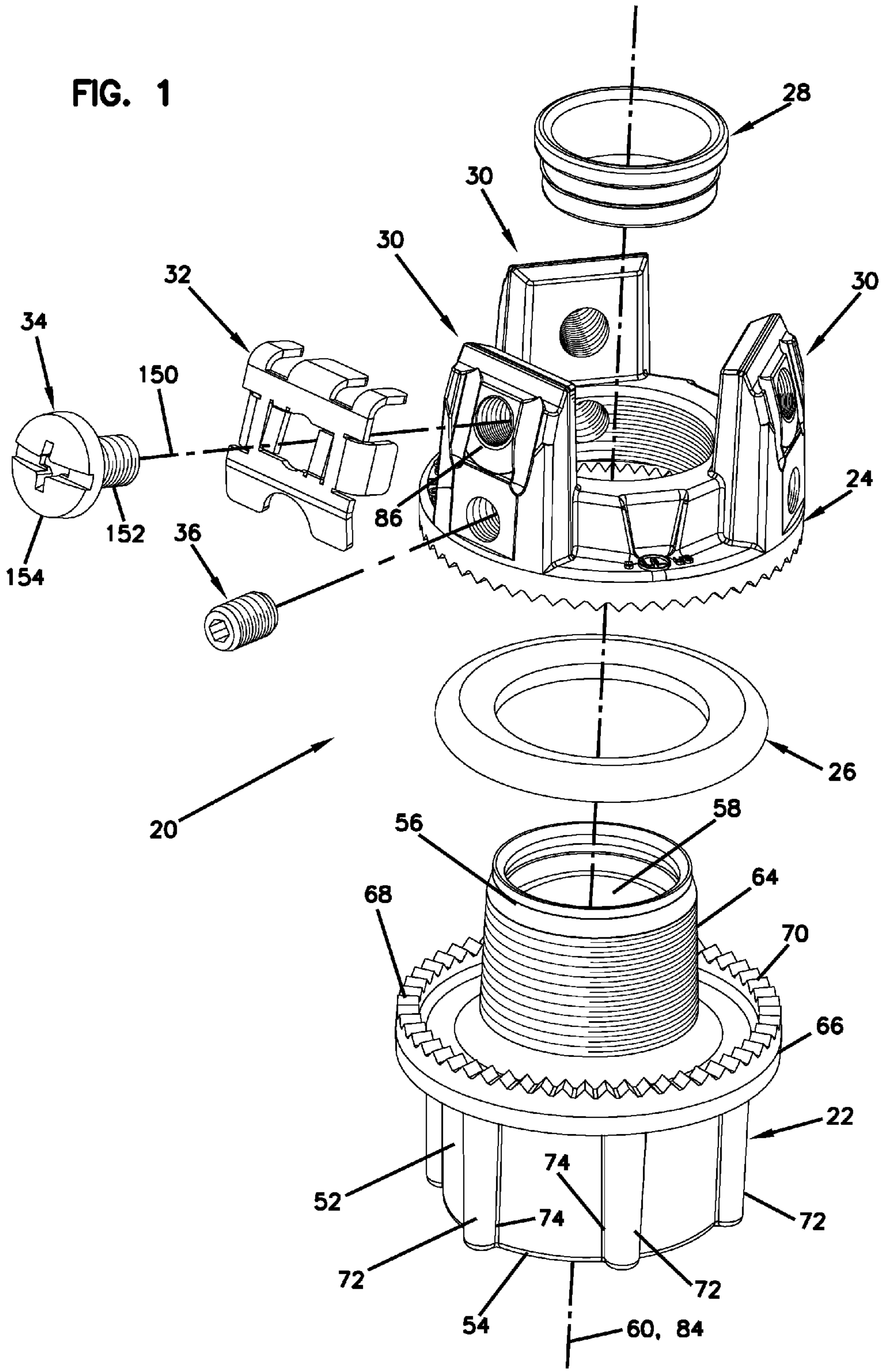
FIG. 1 is an exploded, perspective view of a conduit coupler in accordance with the principles of the present disclosure.

Aspects of the present disclosure relate to conduit couplers having features that allow ground wires to be more quickly secured to the conduit couplers in the field. Other aspects relate to features that offer greater flexibility to the installer in the field by allowing different types of grounding wire retention techniques to be utilized. Aspects of the present disclosure also relate to features that provide enhanced access to ground connection locations of the conduit coupler. Still other aspects of the present disclosure relate to features that assist in allowing the couplers to be manufactured in high volumes at competitive cost levels. Still other aspects relate to features that ensure compliance with pertinent performance requirements such as ATEX requirements.

FIGS. 1-5 depict a conduit coupler 20 in accordance with the principles of the present disclosure. The conduit coupler 20 includes a hub 22 and a lock nut 24 adapted to thread onto the hub 22. The hub 22 and lock nut 24 define a through-passage through which one or more wires, cables, or other media pass. The conduit coupler 20 also includes an environmental seal 26 that mounts between the hub 22 and the lock nut 24. When the conduit coupler 20 is mounted to an aperture of a housing, the environmental seal 26 inhibits water and other contaminants from entering the housing through the aperture.

The conduit coupler 20 further includes a dielectric liner 28 that snap-fits within one end of the hub 22. In an example, the liner 28 is formed of plastic or other non-metallic material. The liner 28 inhibits the wires, cables, or other media from touching an edge of the hub 22 (e.g., from touching a sharp metallic edge of the hub). The liner 28 provides a protective surface against which the wires, cables, or other media can rub or slide as the wires, cables, or other media are routed through the conduit coupler 20. For example, the liner 28 can define an annular inner surface over which the wires, cables, or other media can slide. The annular inner surface is not metallic or otherwise rough, which enables the wires, cables, or other media to ride against the annular inner surface safely (e.g., without breaking, snagging, or otherwise being damaged).

The lock nut 24 of the conduit coupler 20 includes a plurality of ground connection locations 30 spaced about a circumference of the lock nut 24. The conduit coupler 20 can also include a grounding bracket 32 and a grounding screw 34 configured to mount at any of the ground connection locations 30. The conduit coupler 20 further includes a set screw 36 for locking the lock nut 24 in position relative to the hub 22 once the hub 22 and the lock nut 24 have been threaded together.

Figure 5:
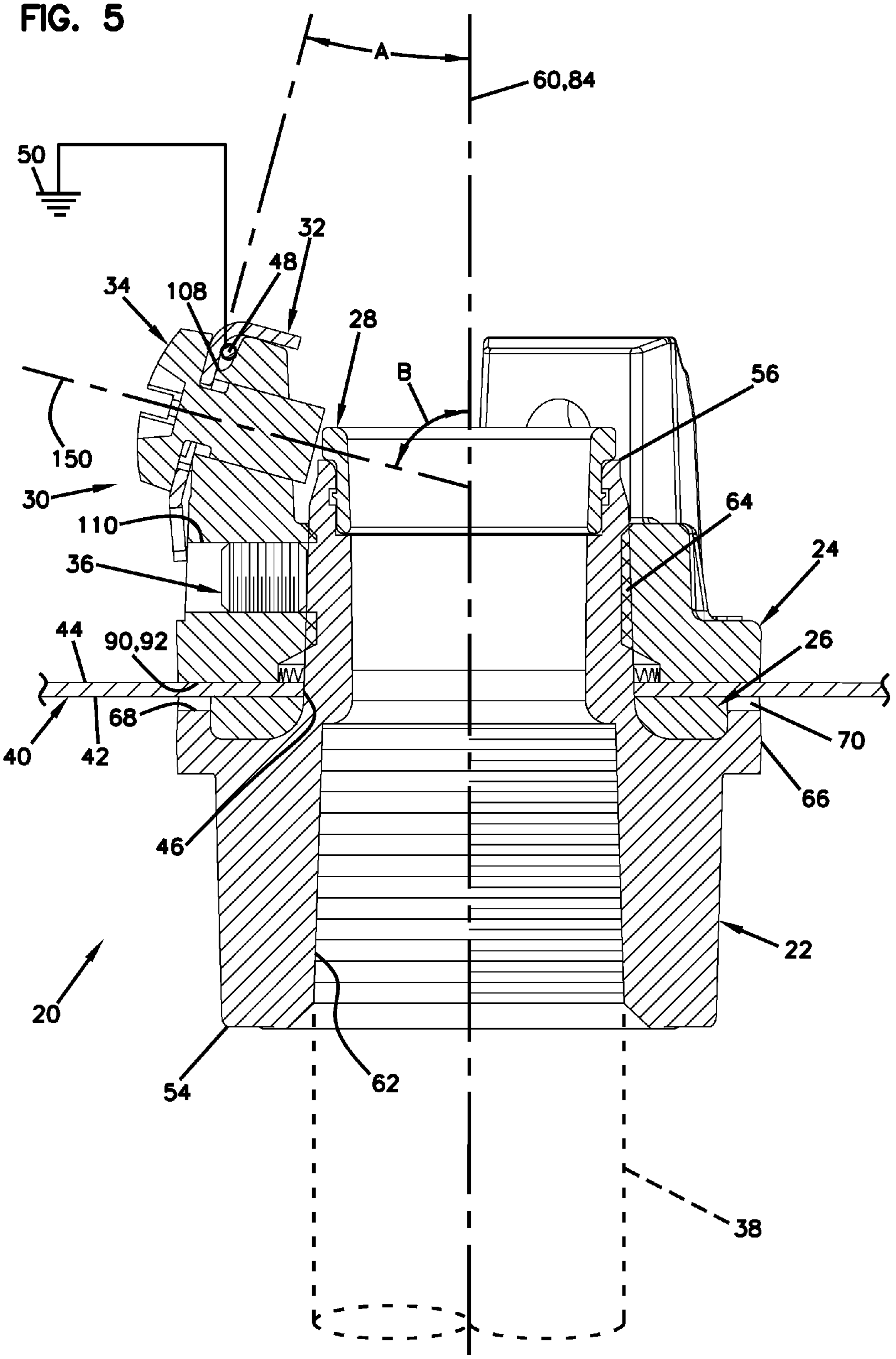
FIG. 5 is a cross-sectional view taken along section line 5-5 of FIG. 4, the cross-sectional view shows the conduit coupler mounted at an opening of an enclosure with a schematic conduit shown attached to the conduit coupler.

FIG. 5 shows the conduit coupler 20 being used to attach a conduit 38 (e.g., an electrical conduit) to a structure such as a wall 40 or panel. The wall 40 can be part of an enclosure (e.g., an electrical enclosure, a junction box, a switching box, an explosion-proof enclosure, etc.). The wall 40 has an outer side 42 and an inner side 44. The wall 40 defines an opening 46 that extends through the wall between the outer side 42 and the inner side 44. The conduit coupler 20 is mounted at the opening 46. The lock nut 24 is located adjacent the inner side 44 of the wall 40 and is threaded on the hub 22 such that the wall 40 is clamped between the lock nut 24 and the hub 22. The conduit 38 is secured to the hub 22 adjacent the outer side 42 of the wall 40. The environmental seal 26 is compressed between the outer side 42 of the wall 40 and the hub 22 to provide environmental sealing around the opening 46. A ground wire 48 is shown electrically connecting the coupler 22, the wall 40 and the conduit 38 to ground 50. The ground wire 48 is electrically connected to one of the ground connection locations 30 and is retained at the ground connection location 30 by the grounding bracket 32. The set screw 36 is shown engaging threads of the hub 22 to lock the lock nut 24 in position relative to the hub 22. Thus, the set screw 36 prevents the lock nut 24 from unintentionally unthreading from the hub 22.

It will be appreciated that the hub 22 and the lock nut 24 preferably have a composition that includes an electrically conductive material such as metal. In certain examples, the hub 22 and the lock nut 24 can include a composition that includes a metal such as zinc, aluminum or stainless steel.

Referring to FIG. 1, the hub 22 of the coupler 20 includes a hub main body 52 having a first end 54 and an opposite second end 56. The hub main body 52 defines a passage 58 that extends through the hub main body 52 along a hub axis 60 from the first end 54 of the hub main body 52 to the second end 56 of the hub main body 52. The first end 54 of the hub main body 52 defines internal threads 62 (see FIG. 5) adapted to mate with external threads of the conduit 38. The hub main body 52 also defines an externally threaded portion 64 (e.g., a threaded stub portion) positioned adjacent the second end 56 of the hub main body 52. The hub 22 also includes a hub flange 66 that surrounds the hub access 60 and projects radially outwardly from the hub main body 52 at an intermediate location between the first and second ends 54, 56 of the hub main body 52. The hub flange 66 includes a hub flange axial end face 68 that faces toward the second end 56 of the hub main body 52. The hub flange axial end face 68 defines a plurality of gripping structures 70. In use, the gripping structures 70 engage and grip the outer side 42 of the wall 40 (see FIG. 5). Example gripping structures include teeth, ribs, ridges, bumps, texturing, knurling, serrations, etc.

Still referring to FIG. 1, the hub 22 further includes a plurality of axial ribs 72 that extend axially between the hub flange 66 and the first end 54 of the hub main body 52. The ribs 72 are provided to facilitate applying torque to the coupler 20 when the hub 22 and the lock nut 24 are threaded together. For example, the ribs 72 allow the hub 22 to be readily grasped with a torque-applying tool such as a pipe wrench, pliers, vice-grip or other tool. Additionally, the ribs 72 define surfaces 74 that can be engaged by a tool such as the tip of a flat-head screwdriver. By placing the screwdriver tip against the surface 74 and the striking screwdriver with a hammer, torque can be applied to the hub 22. In other examples, other structures can be used in place of the ribs 72 or in combination with the ribs to facilitate applying torque to the hub 22. Example structures include wrench flats, recesses (e.g., screw driver recesses), projections having alternative shapes, or other structures.

Referring to FIGS. 6-12, the lock nut 24 includes a nut main body 76 having a first end 78 and an opposite second end 80. The lock nut 24 defines a central opening 82 that extends through the nut main body 76 along a lock nut axis 84 from the first end 78 of the nut main body 76 to the second end 80 of the lock nut main body 76. The lock nut 24 also includes a plurality of the ground connection locations 30 (e.g., three are depicted) spaced evenly about a circumference of the lock nut 24 that extends around the lock nut axis 84. The ground connection locations 30 each include a grounding screw opening 86 that is internally threaded and sized to receive the grounding screw 34. Thus, grounding screws 34 can be threaded into the grounding screw openings 86 as needed to secure ground wires to the ground connection locations 30. It will be appreciated that typically only one of the ground connection locations 30 will be utilized for grounding for a given installation. However, the provision of at least three on connection locations 30 provides enhanced access (e.g., essentially 360° access). Typically, after the coupler 20 has been mounted to the wall 40, the ground connection location 30 facing most directly toward an open side of the enclosure would be most readily accessible. After assembly of the coupler 20 and attachment of the ground wire, the open side of the enclosure may be closed by an access door, panel or cover.

Referring still to FIGS. 6-12, the lock nut 24 also includes a lock nut flange 88 that surrounds the lock nut axis 84 and projects radially outwardly from the nut main body 76 at a location adjacent to the first end 78 of the nut main body 76. The lock nut flange 88 includes a lock nut flange axial end face 90 that faces axially outwardly from the first end 78 of the nut main body 76. The lock nut flange axial end face 90 defines a plurality of gripping structures 92 of the type previously described with respect to the hub flange axial end face 68. When the coupler 20 is secured at the opening 46 of the wall 40, the gripping structures 92 engage and grip the inner side 44 of the wall 40 (see FIG. 5).

Figure 2:
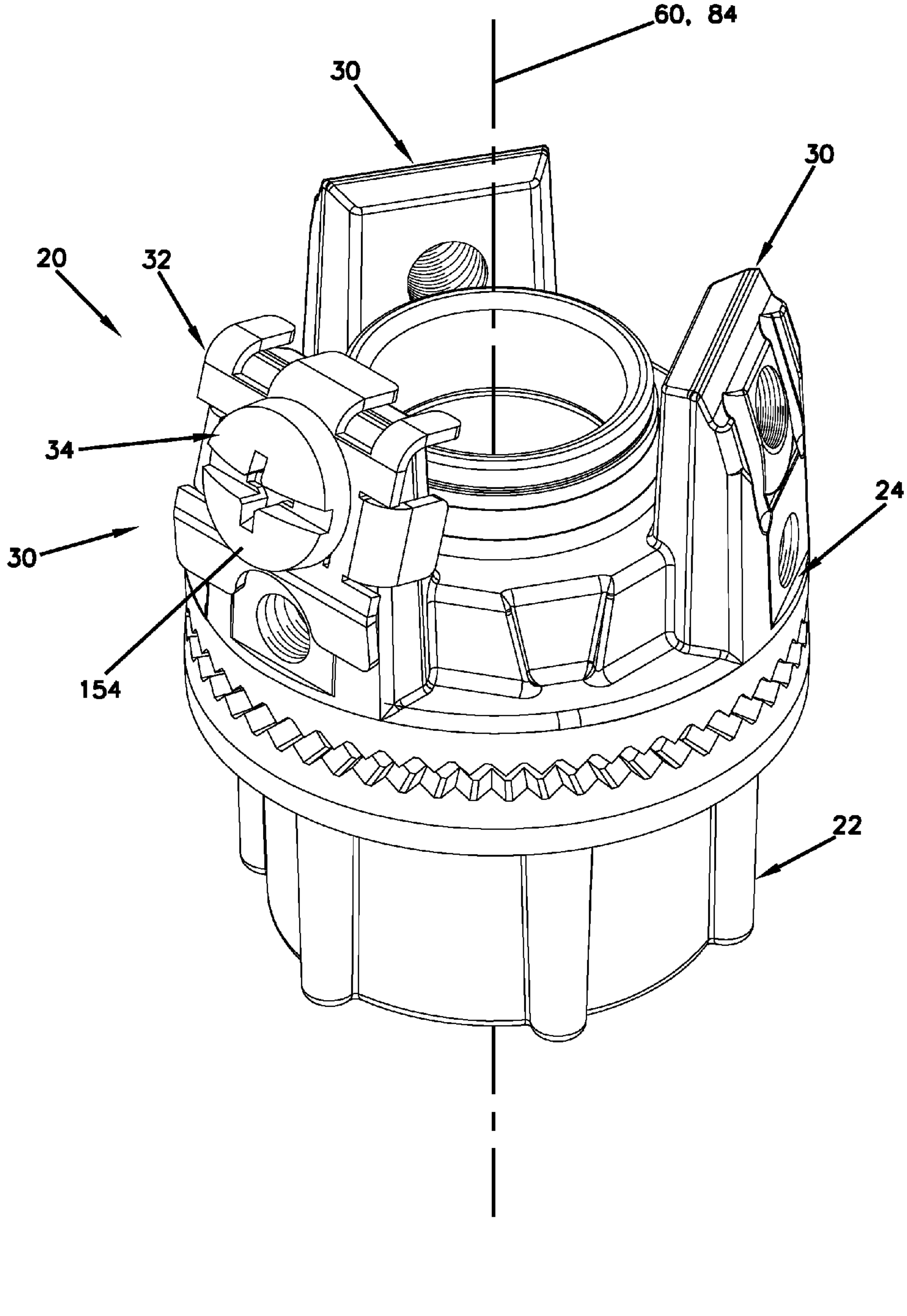
FIG. 2 is a perspective view of the conduit coupler of FIG. 1 assembled together.
Figure 3:
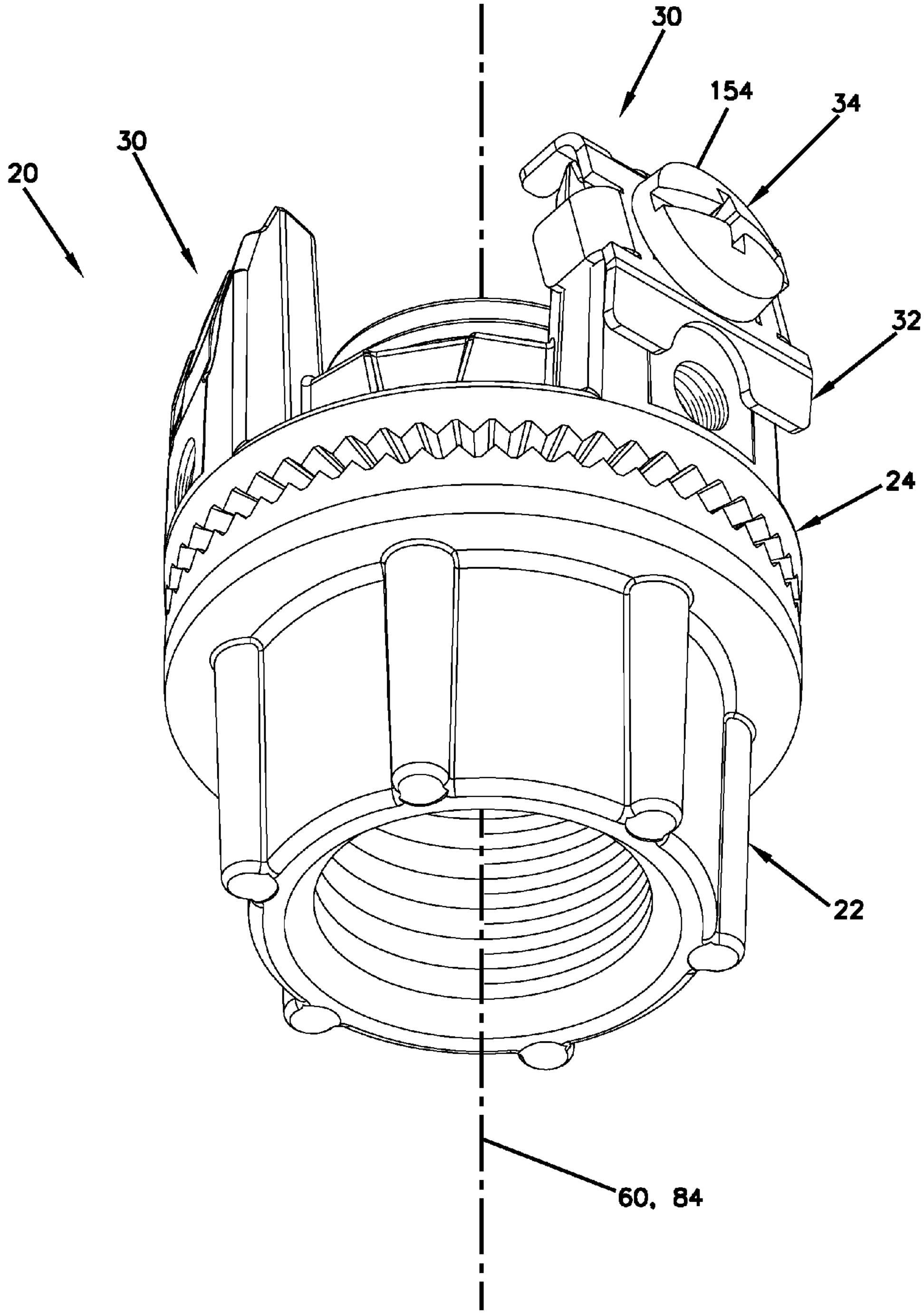
FIG. 3 is another perspective view of the assembled conduit coupler of FIG. 2 viewed from a perspective opposite from the perspective of FIG. 2.
Figure 4:
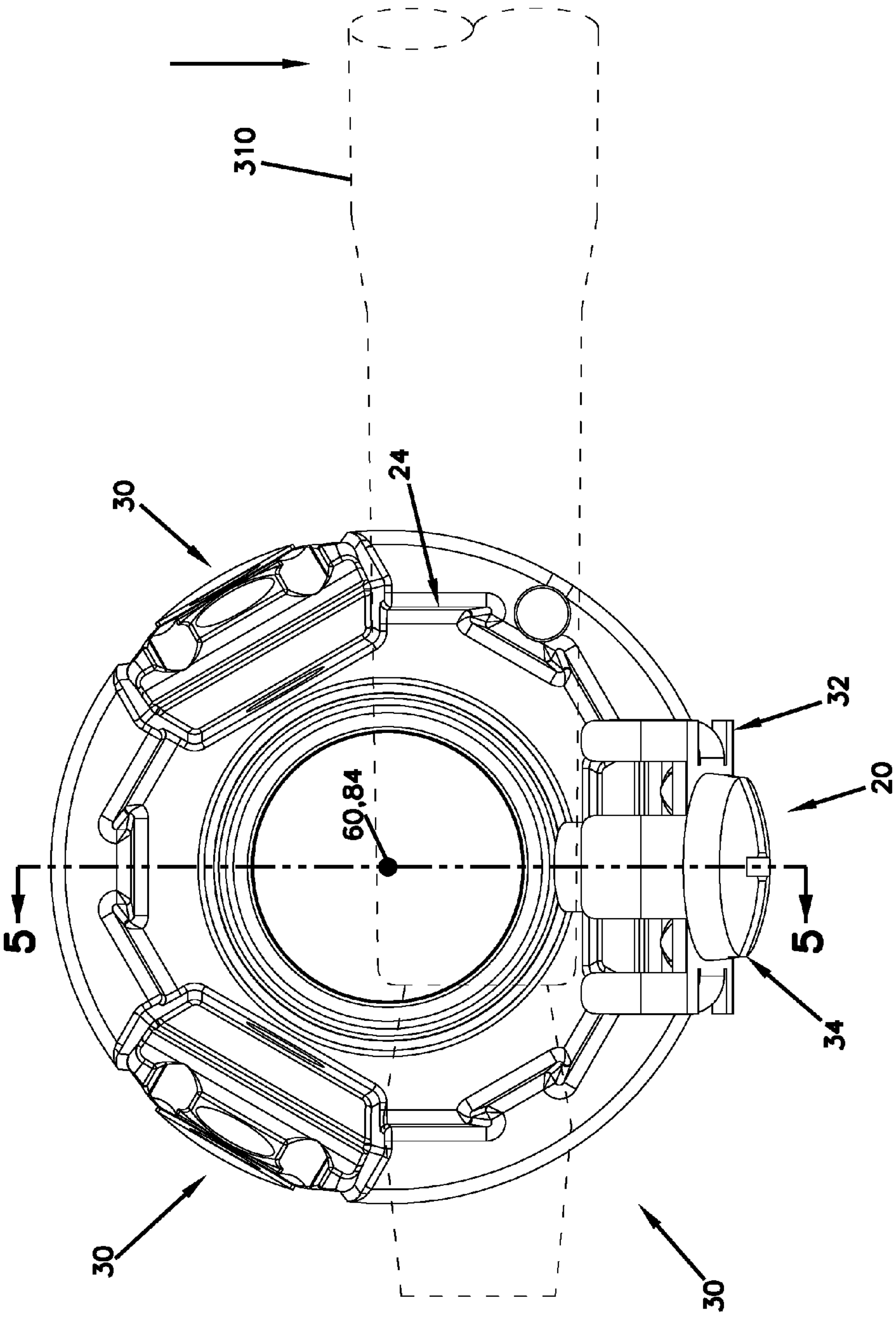
FIG. 4 is an end view of the conduit coupler of FIGS. 1-3.

Referring to FIGS. 2 and 3, when the lock nut 24 is mounted on the hub 22, the lock nut axis 84 is co-axial with the hub axis 60. Also, the externally threaded portion 64 of the main hub body 52 is threaded within the central opening 82 of the lock nut main body 76. Additionally, the hub flange axial end face 68 and the lock nut axial end face 90 oppose one another. When the coupler 20 is mounted at the opening 46 of the wall 40, the wall 40 is clamped between the hub flange axial end face 68 and the lock nut flange axial end face 90. In the depicted example of the coupler 20, each of the ground connection locations 30 includes at least one linear wire retention slot for receiving a straight end portion of a ground wire. Each of the linear ground wire retention slots is configured to allow a straight end portion of a ground wire to be inserted axially therein in a linear insertion motion. The grounding bracket 32 is configured to retain a ground wire within a given one of the linear grounding wire retention slots. As compared to bend a tip of a ground wire into a hook and hooking the ground wire at least partially around a given grounding screw, the linear insertion technique enabled by ground connection locations in accordance with the principles of the present disclosure allow ground wires to be more quickly terminated to the ground connection locations. While linear insertion of ground wires is preferred, it will be appreciated that at least some technicians may prefer bending the end of a ground wire and installing the bent end around a grounding screw. Thus, certain ground connection locations in accordance with the principles of the present disclosure can accommodate either a wire that is bent into a hook and looped around the grounding screw 34, or a ground wire that has a straight end portion that can be linearly inserted into one of the linear ground wire retention slots.

Figure 6:
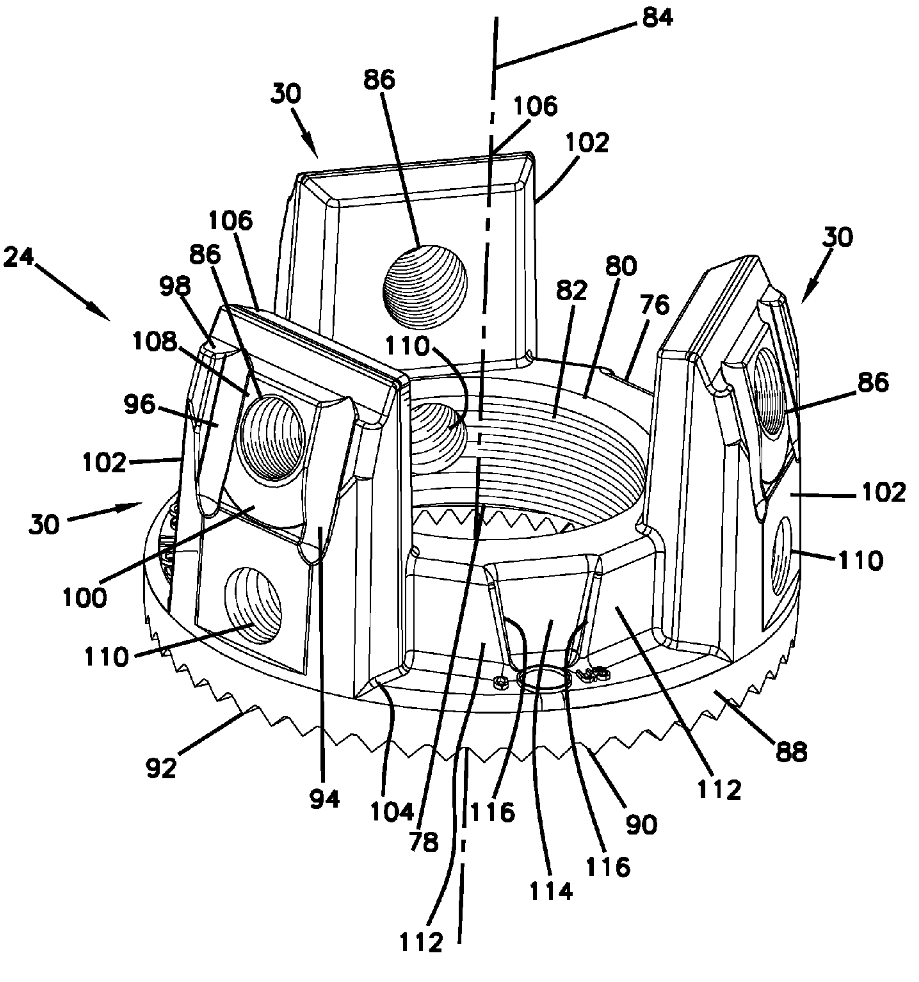
FIG. 6 is a perspective view of a lock nut of the conduit coupler of FIGS. 1-5.
Figure 7:
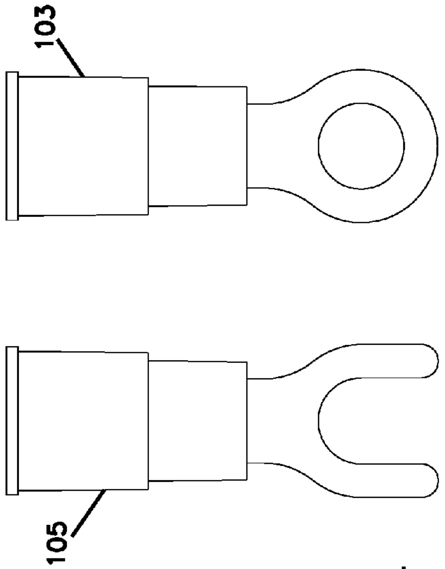
FIG. 7 is a first side view of the lock nut of FIG. 6.
Figure 7:
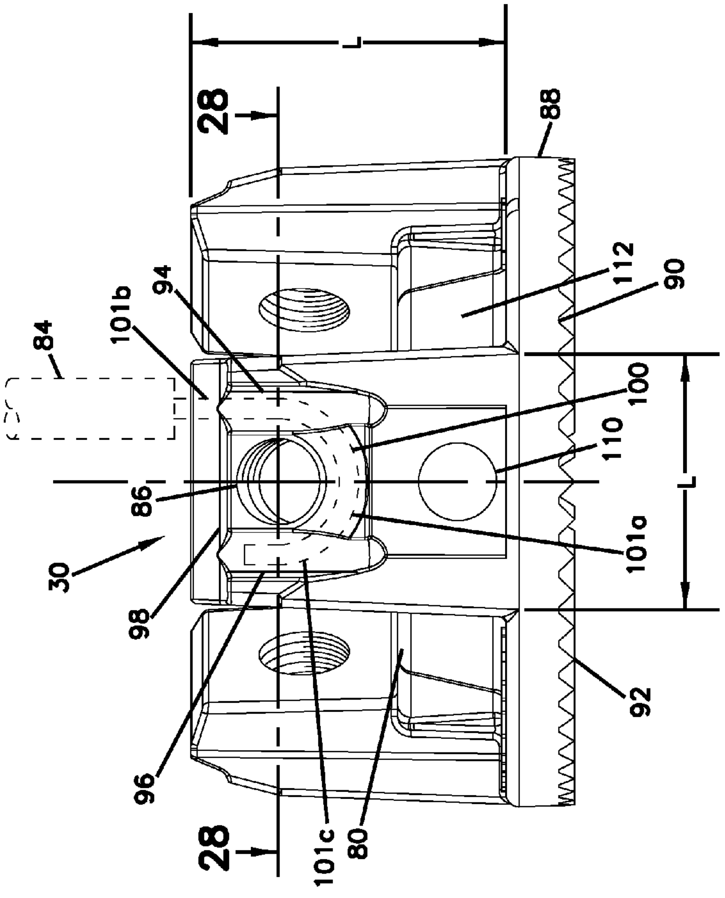
Figure 8:
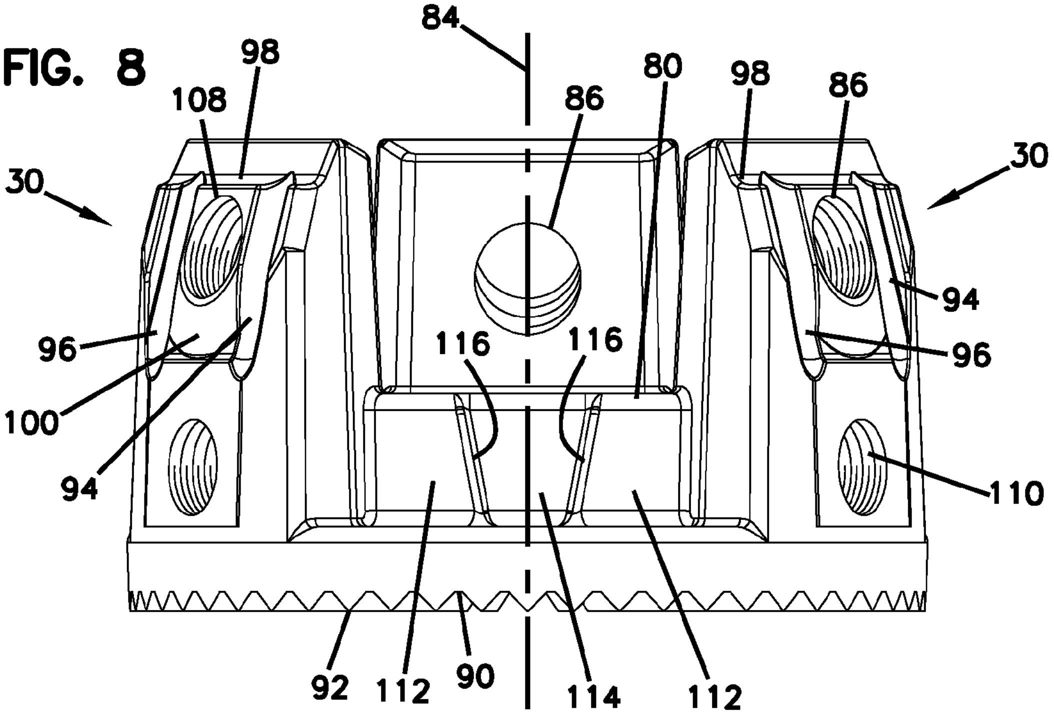
FIG. 8 is a second side view of the lock nut of FIG. 6.
Figure 9:
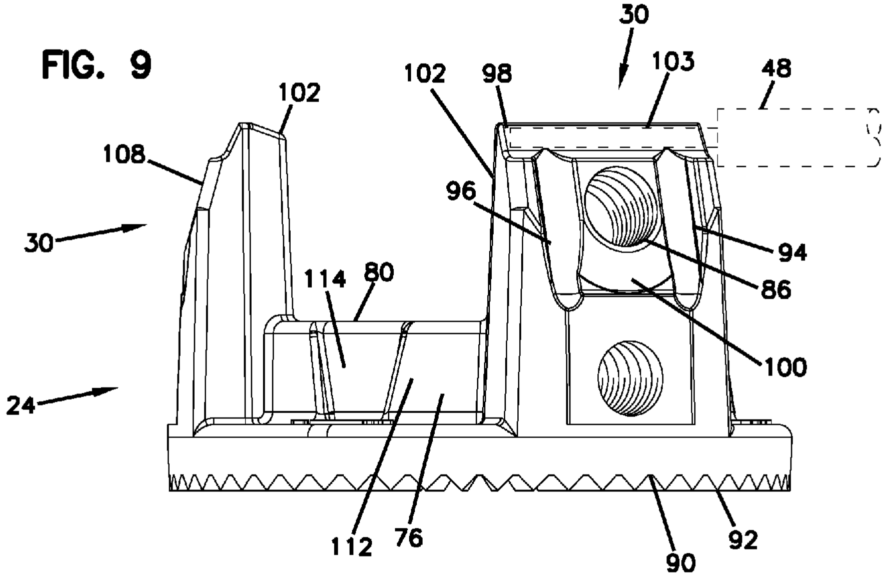
FIG. 9 is a third side view of the lock nut of FIG. 6.
Figure 10:
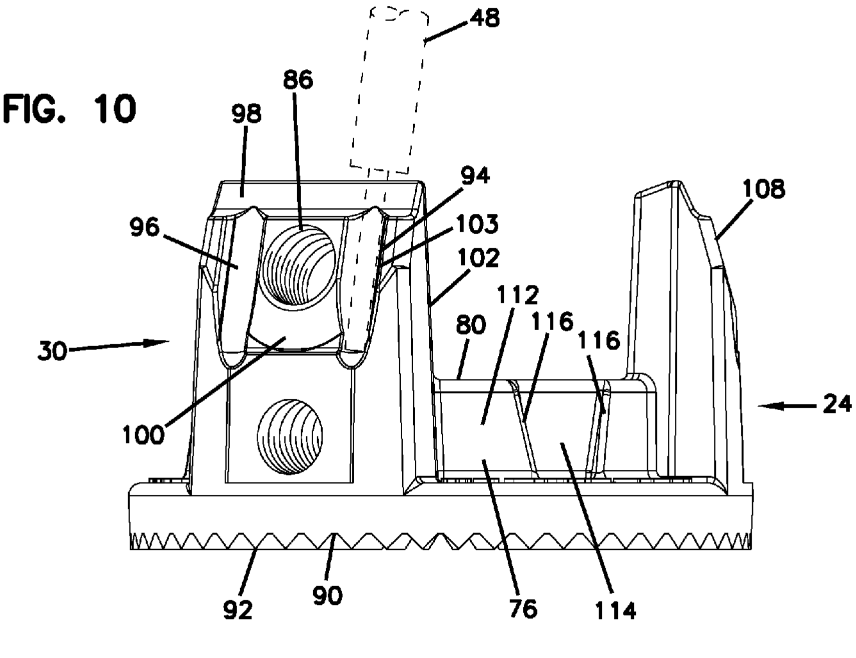
FIG. 10 is a fourth side view of the lock nut of FIG. 6.
Figure 11:
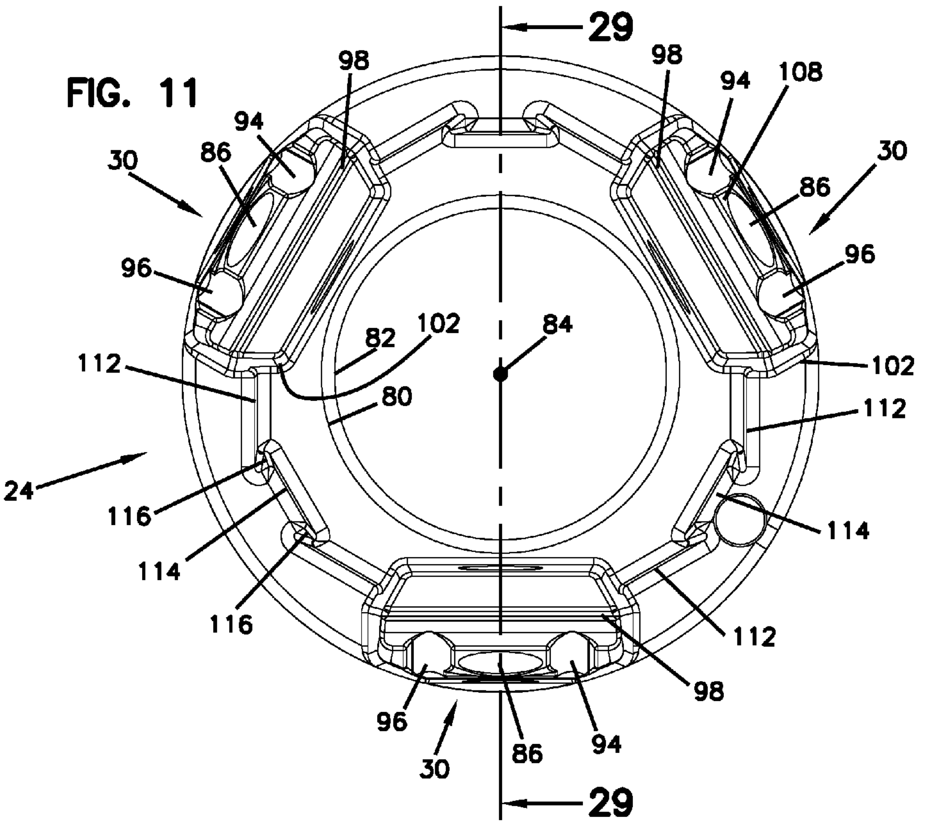
FIG. 11 is a first end view of the lock nut of FIG. 6.
Figure 12:
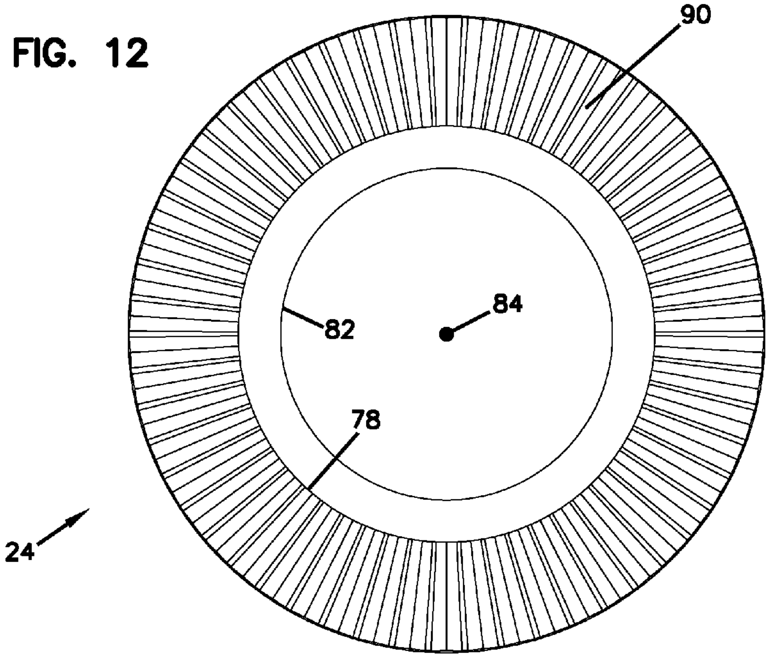
FIG. 12 is an opposite second end view of the lock nut of FIG. 6.

Referring to FIGS. 6-10, each of the ground connection locations 30 includes three ground wire retention slots. The linear ground wire retention slots can include linear slots 94 and 96 that are positioned on opposite sides of each grounding screw opening 86 and that have lengths that extend generally along the lock nut axis 84. The linear slots 94, 96 can be referred to as vertical slots. Each of the ground connection locations 30 can also include a linear ground wire retention slot depicted as a linear slot 98 having a length that extends generally transversely relative to the lock nut axis 84. Linear slot 98 may be referred to as a horizontal slot. It will be appreciated that linear slots 94, 96 are generally perpendicular relative to linear slot 98. Additionally, linear slots 94, 96 at least partially intersect linear slot 98. Each of the linear slots 94, 96 or 98 is configured for receiving a straight end portion of a ground wire. Each ground connection location 30 further includes a curved recess 100 (see FIG. 7) that extends partially around the grounding screw opening 86 between the linear slots 94, 96. The curved recess 100 provides clearance for receiving a bent/curved portion 101*a* of a ground wire 48 in the event an installer prefers using a hooked ground wire termination technique. When using a hooked ground wire termination technique, a straight portion 101*b* of the ground wire fits within linear slot 94, the curved/bent portion 101*b* of the ground wire fits within curved recess 100 and a linear portion 101*c* of the ground wire fits within linear slot 96. A schematic depiction of this type of termination technique is shown at FIG. 7. FIG. 9 shows an example ground wire 48 having a straight end portion 103 linearly inserted in the linear slot 98 that is generally transversely oriented relative to the lock nut axis 84. FIG. 10 shows a straight end portion 103 of a ground wire 48 that has been linearly inserted into the linear slot 94 that extends generally along the lock nut axis 84.

It will be appreciated that for certain installations a technician may want to utilize alternative grounding techniques. For example, the technician may install a terminal at the end of the ground wire 48 by crimping, soldering, or like techniques. FIG. 7 shows two example terminal styles compatible with the ground connection locations 30 which include a ring-shaped terminal 103 and a forked-shaped terminal 105. Such terminals can be used with ground wires having larger diameters (e.g., 8 or 10 gauge wires). In certain examples, the terminals can be clamped in place at the ground connection locations by the grounding brackets 32. In still other examples, a conventional external ground lug can be secured to one of the ground connection locations 30 by a screw threaded into the opening 86 or by other means without the use of the grounding plate 32. The grounding lug provides another means for connecting a larger ground wire to one of the ground connection locations.

Figure 28:
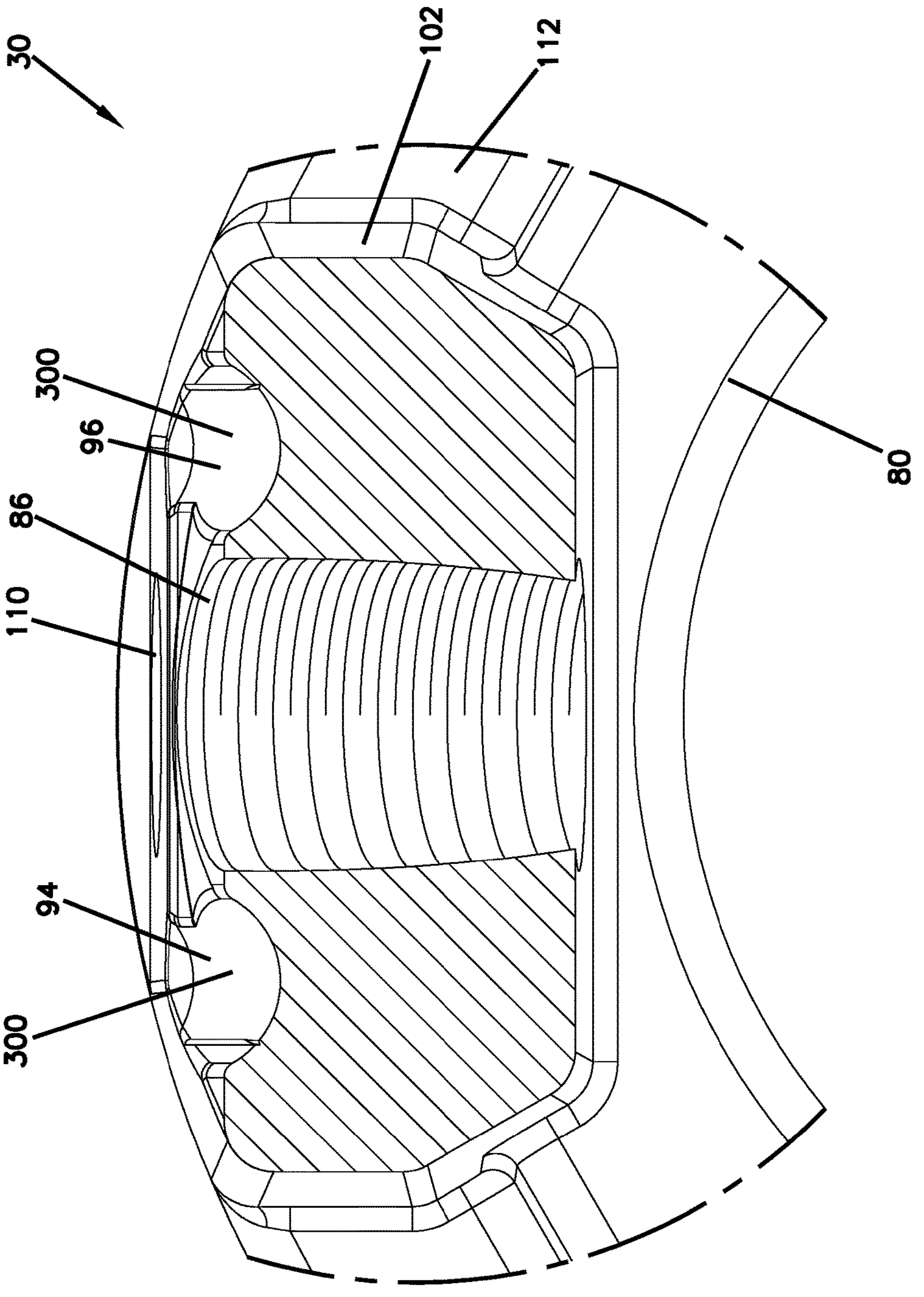
FIG. 28 is a cross-sectional view taken along section line 28-28 of FIG. 7.
Figure 28A:
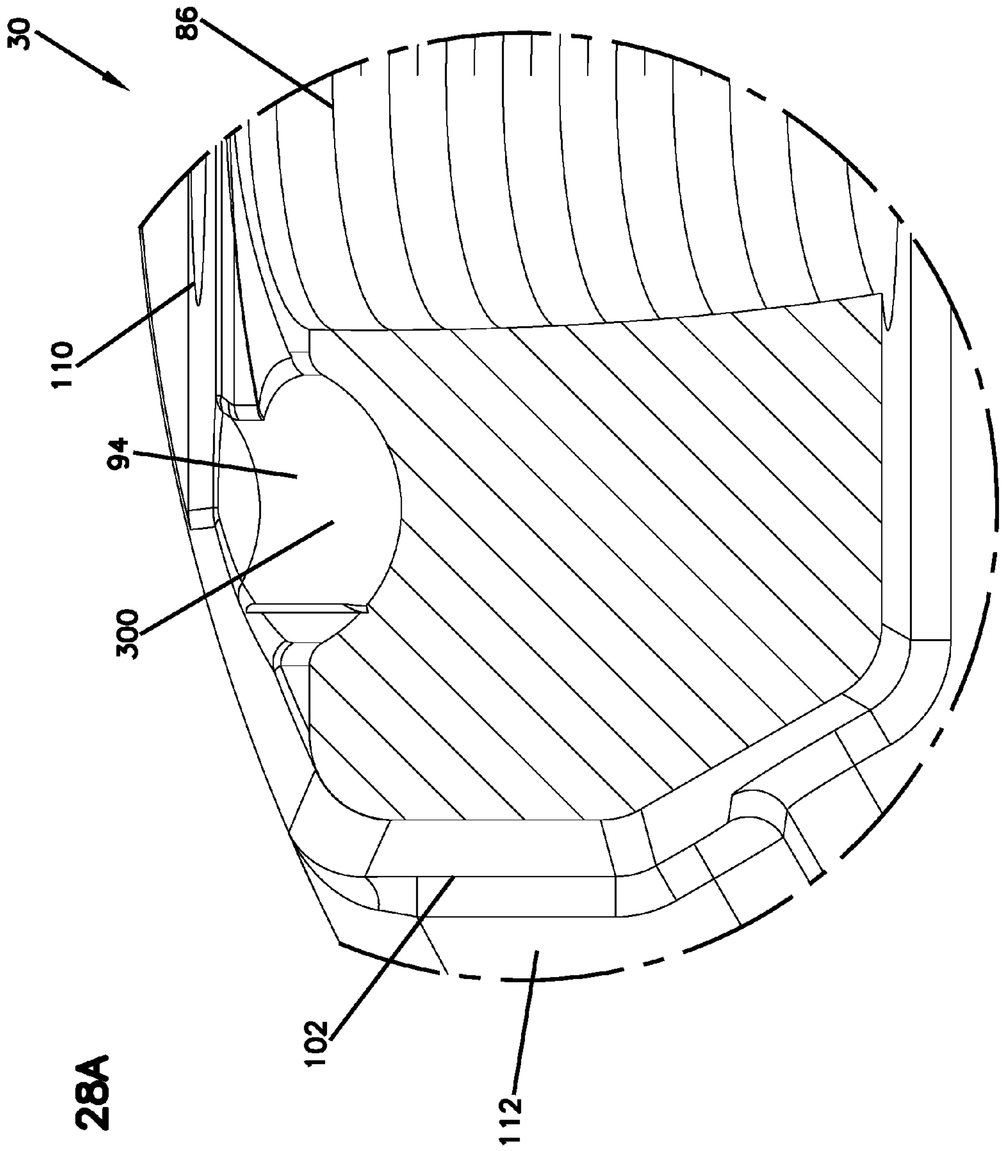
FIG. 28A is an enlarged view of a portion of FIG. 28.
Figure 29:
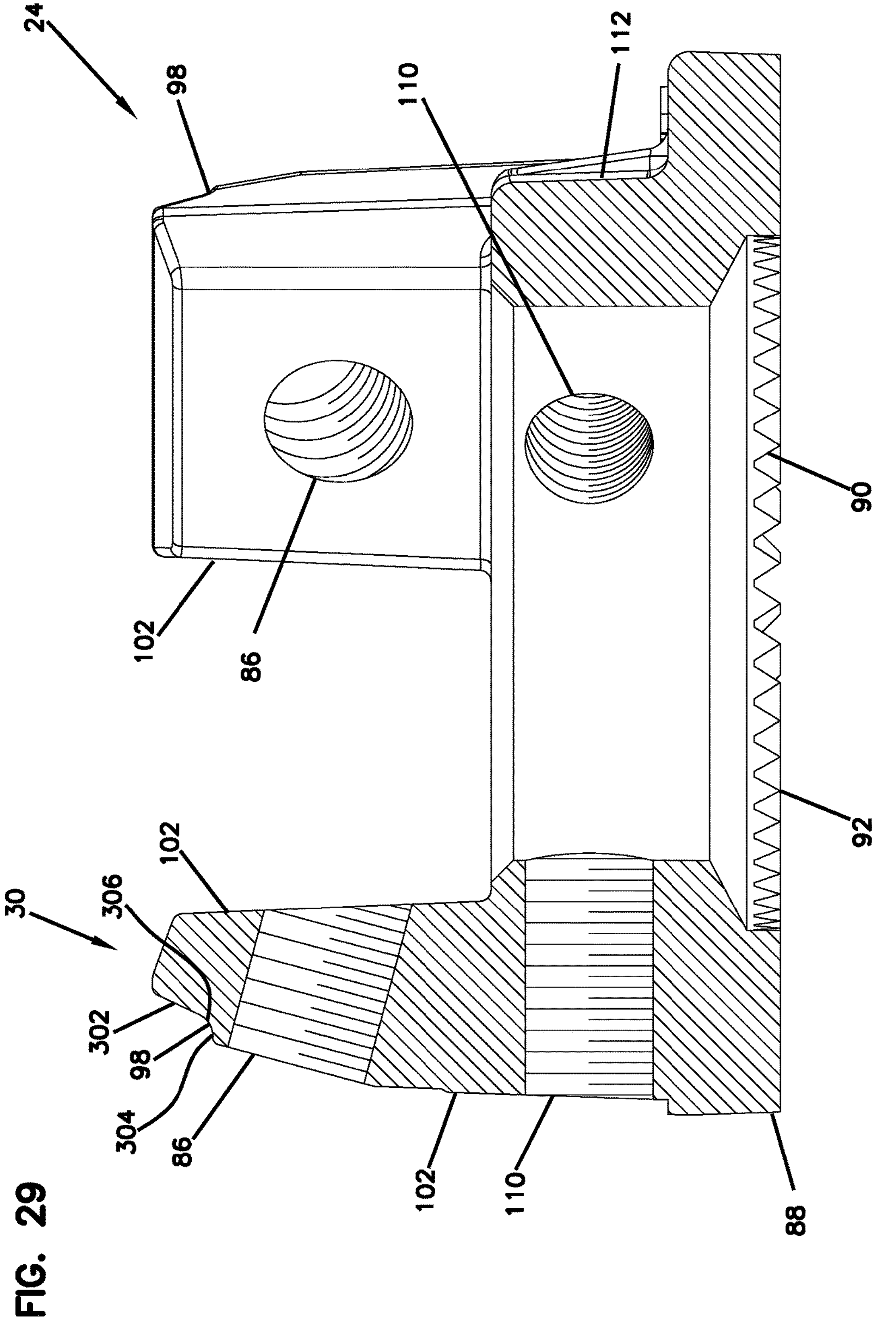
FIG. 29 is a cross-sectional view taken along section line 29-29 of FIG. 11.
Figure 29A:
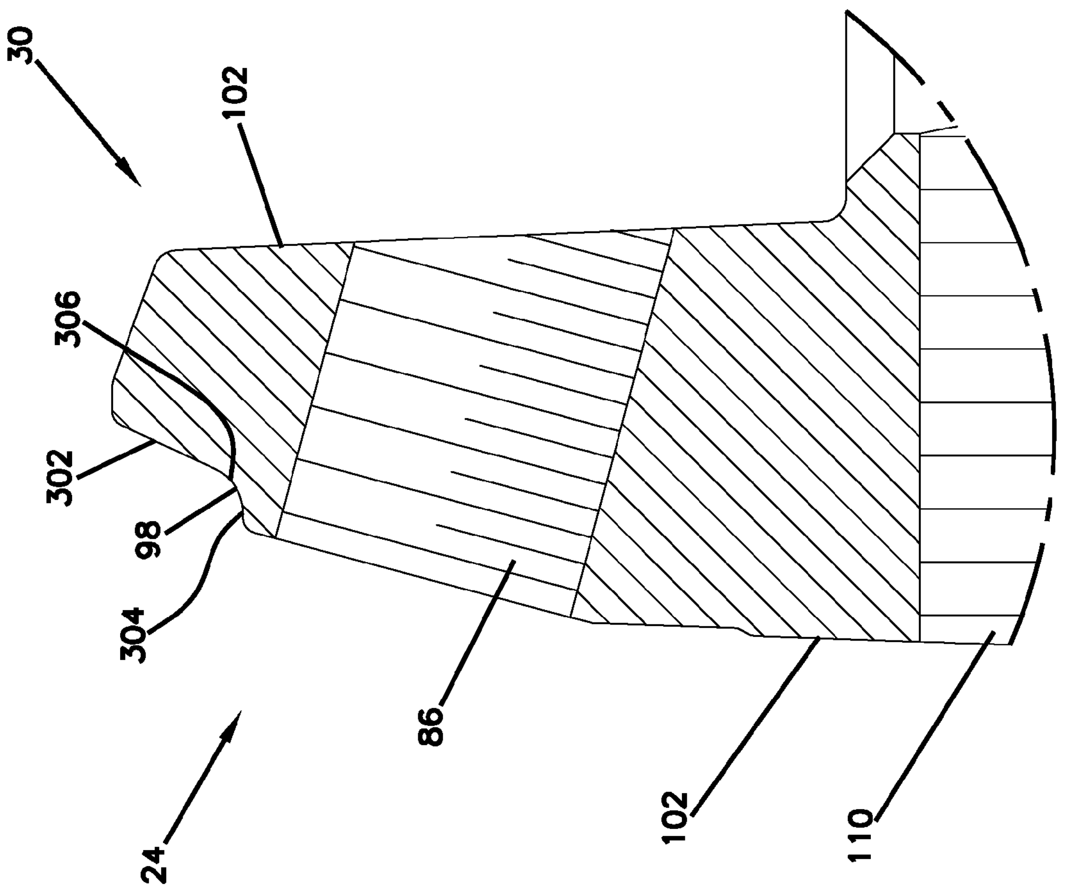
FIG. 29A is an enlarged view of a portion of FIG. 29.
Figure 30:
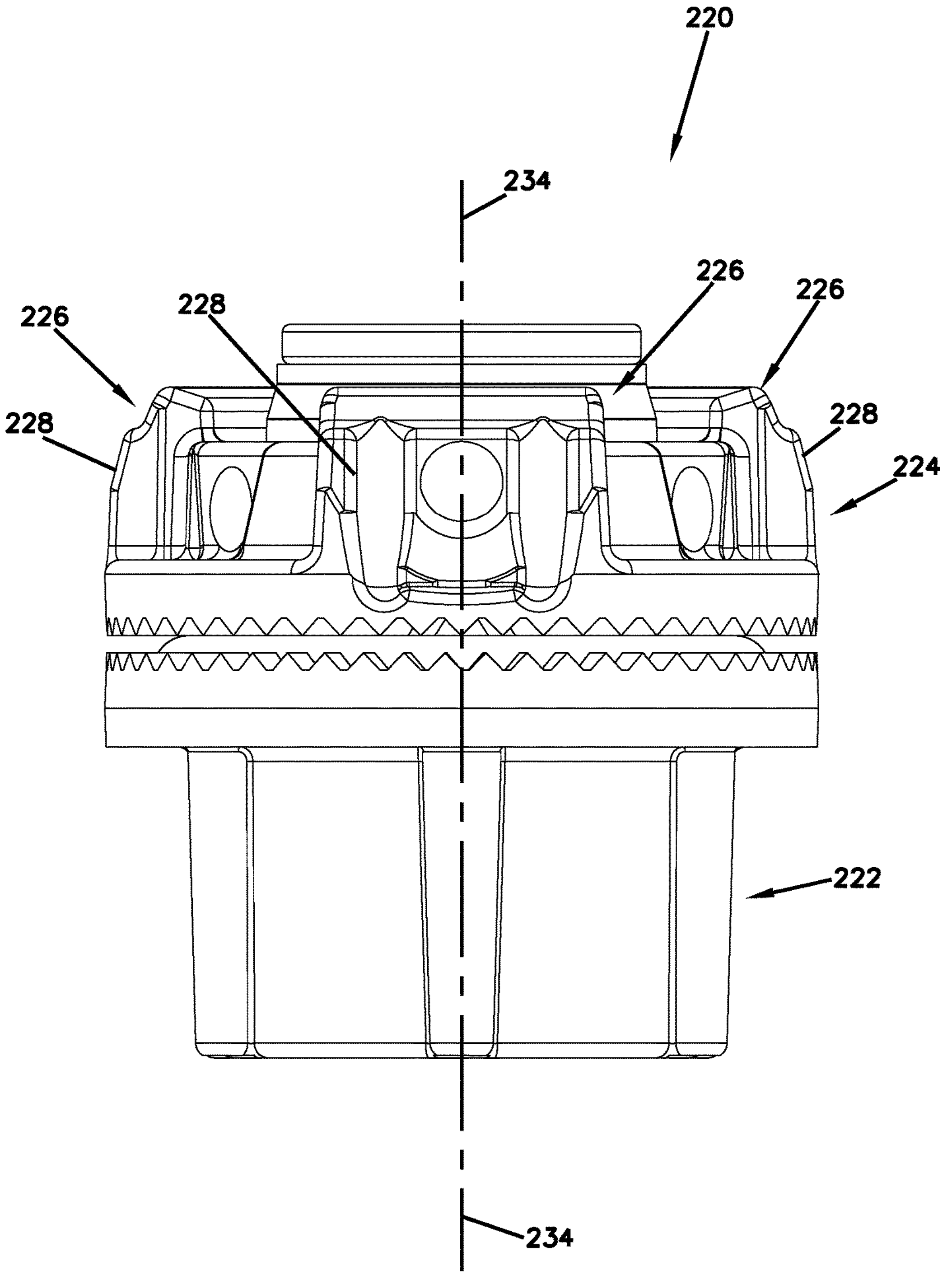
FIG. 30 is a perspective view of another conduit coupler assembled together in accordance with the principles of the present disclosure.
Figure 31:
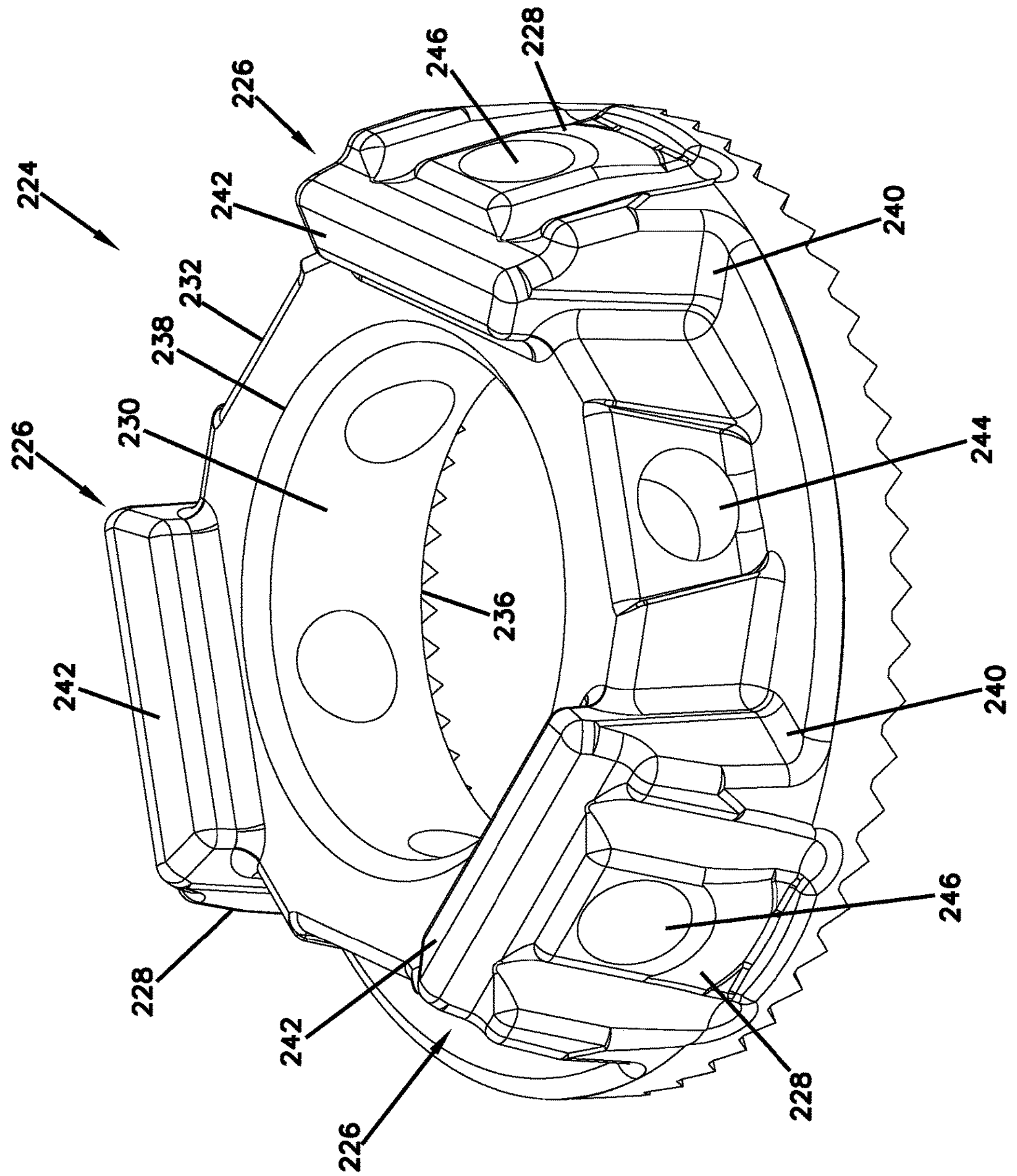
FIG. 31 is a perspective view of a lock nut of the conduit coupler of FIG. 30.

The grooves 94, 96 and 98 can be provided with transverse cross-sectional shapes (i.e. transverse cross-sectional profiles) designed to accommodate ground wires of different diameters. The groove profiles can be selected so that the smallest anticipated ground wire protrudes a sufficient distance from the groove profile to allow effective clamping contact with the grounding bracket 32. The groove profiles can also be selected so that the largest anticipated ground wire can be effectively captured and secured in place by the grounding bracket 32. In certain examples, the groove profiles can be tapered, curved, v-shaped, trapezoid-shaped, curved along an arc having a constant radius, curved along a curve having varying radii, or can have other shapes. Referring to FIGS. 28 and 28A, the grooves 94 and 96 have curved shapes. In certain examples, the curved shape can be defined by a curved surface 300 that curves along an arc having a constant radius. The grooves 94, 96 can define open outer sides. Referring to FIGS. 29 and 29A, the grooves 98 can include straight surfaces 302, 304 aligned at an angle relative to one another so as to generally form a v-shape. In use, the surfaces 302, 304 can each make line contact with a ground wire mounted within the groove 98. The straight surfaces 302, 304 can be connected by a curved surface 306. In certain examples, the straight surface 302 is longer than the straight surface 304 to make the slot 98 more open to facilitate inserting a grounding wire therein.

Referring to FIG. 6, in certain examples, the ground connection locations 30 can be provided on grounding towers 102 that offset the ground connection locations 30 beyond the second end 80 of the nut main body 76. The grounding towers 102 are spaced uniformly about the lock nut axis 84 and are separated from one another by circumferential gaps. Each of the grounding towers 102 has a base end 104 integral with the nut main body 76 and a free end portion 106 that extends axially beyond the second end 80 of the nut main body 76. The grounding screw openings 86 are defined through the free end portions 106 of the grounding towers 102. In certain examples, the grounding screw openings 86 are defined through angled faces 108 located at the free end portions 106 of the grounding towers 102. The linear slots 94, 96 can extend along the angled faces 108. In certain examples, the angled faces 108 are angled at angles A in the range of 10-40° relative to the lock nut axis 84 (see FIG. 5) such angling provides improved access to the ground connection locations 30. It will also be appreciated that the grounding screw openings 86 are oriented at non-perpendicular angles relative to the lock nut axis 84. In certain examples, the non-perpendicular angles can include angles B in the range of 10-50° relative to the lock nut axis 84 (see FIG. 5). In certain examples, each of the grounding towers 102 also defines an internally threaded set screw opening 110 that extends through the base end portion 104 of the grounding tower 102 to the central opening 82 of the lock nut 24. The set screw openings 110 are adapted to receive set screws 36 for locking the lock nut 24 in position relative to the hub 22.

Each of the grounding towers 102 can include a length L (see FIG. 7) that extends along the lock nut axis 84 and a width W (se FIG. 7) that is transverse relative to the lock nut axis 84. The linear slots 94, 96 have lengths that extend along the length L of the grounding towers 102. The linear slots 98 have lengths that extend along the widths W of the grounding towers 102.

The lock nut 24 further includes structure for facilitating applying torque to the lock nut 24 for rotating the lock nut 24 about the lock nut axis 84. For example, torque transfer interfaces can be provided on the exterior of the lock nut main body 76 in the regions circumferentially between the grounding towers 102. Example features can include wrench flats 112. Additional features can include notches 114 defined by engagement surfaces 116. Engagement surfaces 116 can extend from the second end 80 of the nut main body 76 toward the lock nut flange 88 and can taper towards one another as the engagement surfaces 116 extend toward the lock nut flange 88. The engagement surfaces 116 provide surfaces against which the flat tip of a flat-head screwdriver can be placed. With the tip of the flat-head screwdriver engaging one of the engagement surfaces 116, the screwdriver can be tapped with a hammer to apply torque to the lock nut 24 about the lock nut axis 84. It is also possible for a screwdriver 310 (see FIG. 4) or other relatively long, thin tool to be inserted lengthwise through two of the circumferential gaps between the towers 102 so that the moment arm of the tool can be used to provide leverage for applying torque through the towers 102 to the lock nut 24.

Referring to FIGS. 13-19, the grounding bracket 32 includes a bracket main body 120 defining a screw pass-through opening 122 for receiving the grounding screw 34. The bracket main body 120 is generally rectangular and includes a first side 124 positioned opposite from a second side 126, and a third side 128 positioned opposite from a fourth side 130. The third and fourth sides 128, 130 extend between the first and second sides 124, 126. A plurality of wire retention tabs 132*a*, 132*b* project from the first side 124 of the bracket main body 120 and a pair of stabilization tabs 134 project from the second side 126 of the bracket main body 120. A clearance notch 136 is defined between the stabilization tabs 134 for providing clear access to the set screw opening 110 when the grounding bracket 32 is mounted on one of the grounding towers 102. In this way, the grounding bracket 32 does not interfere with insertion of the set screw 36 into the set screw opening 110. The wire retention tabs 132*a* is a middle retention tab and retention tabs 132*b* are outer retention tabs. The retention tab 132*a* is wider than the retention tabs 132*b*. Notches 140 are defined between the retention tab 132*a* and the retention tabs 132*b*. When the grounding bracket 32 is mounted at one of the ground connection locations 30, the wire retention tabs 132*a*, 132*b* cover and overhang the linear slot 98 and the notches 140 align with the linear slots 94, 96. In this way, the wire retention tabs 132*a*, 132*b* are configured for retaining a ground wire within the linear slot 98 in the event a technician desires to utilize the linear slot 98 for terminating a ground wire. If the technician desires to use one of the linear slots 94, 96 to terminate a ground wire, the notches 140 provide clearance for allowing the ground wire to be routed into the selected linear slot 94 or 96. In one example, the retention tab 132*a* is removable to allow the grounding bracket 32 to accommodate grounding terminal such as the grounding terminals 103, 105 shown at FIG. 7.

Figure 20:
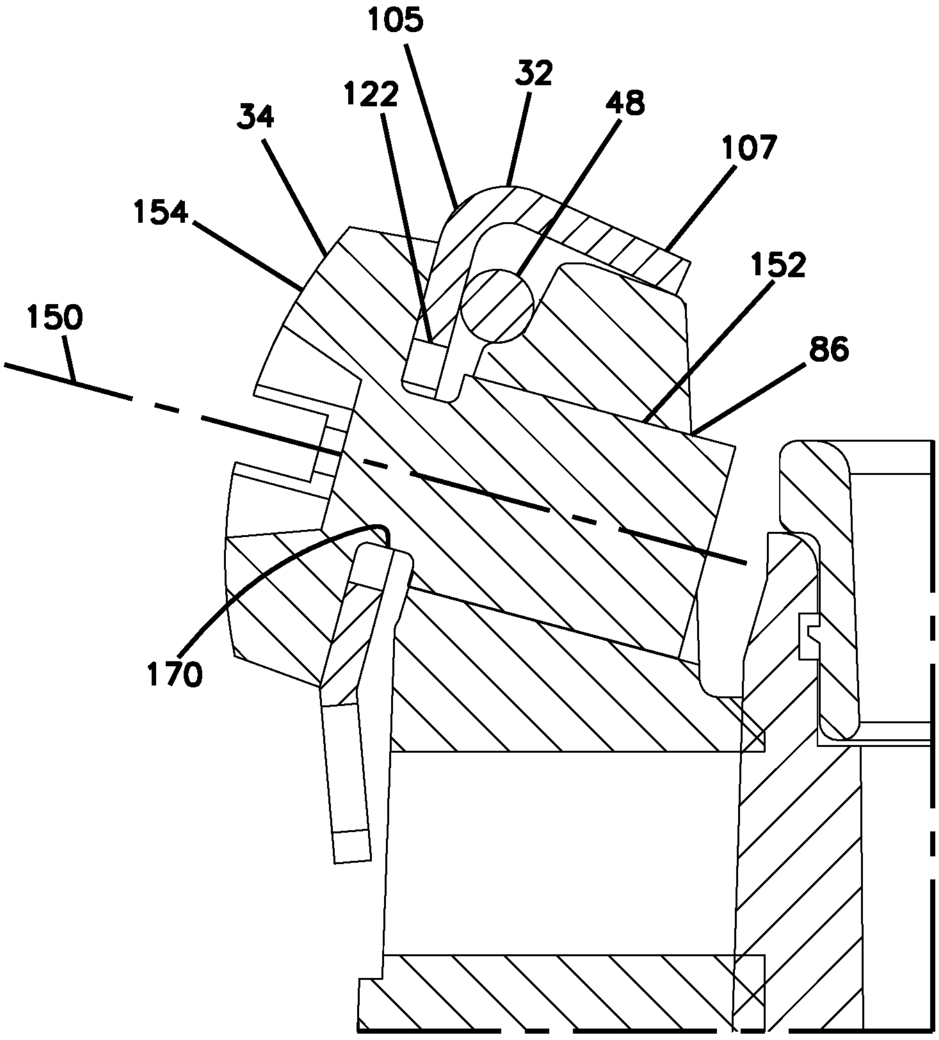
FIG. 20 shows one of the ground connection locations of the coupler of FIGS. 1-5 retaining a 14-gauge ground wire in a horizontal orientation.
Figure 21:
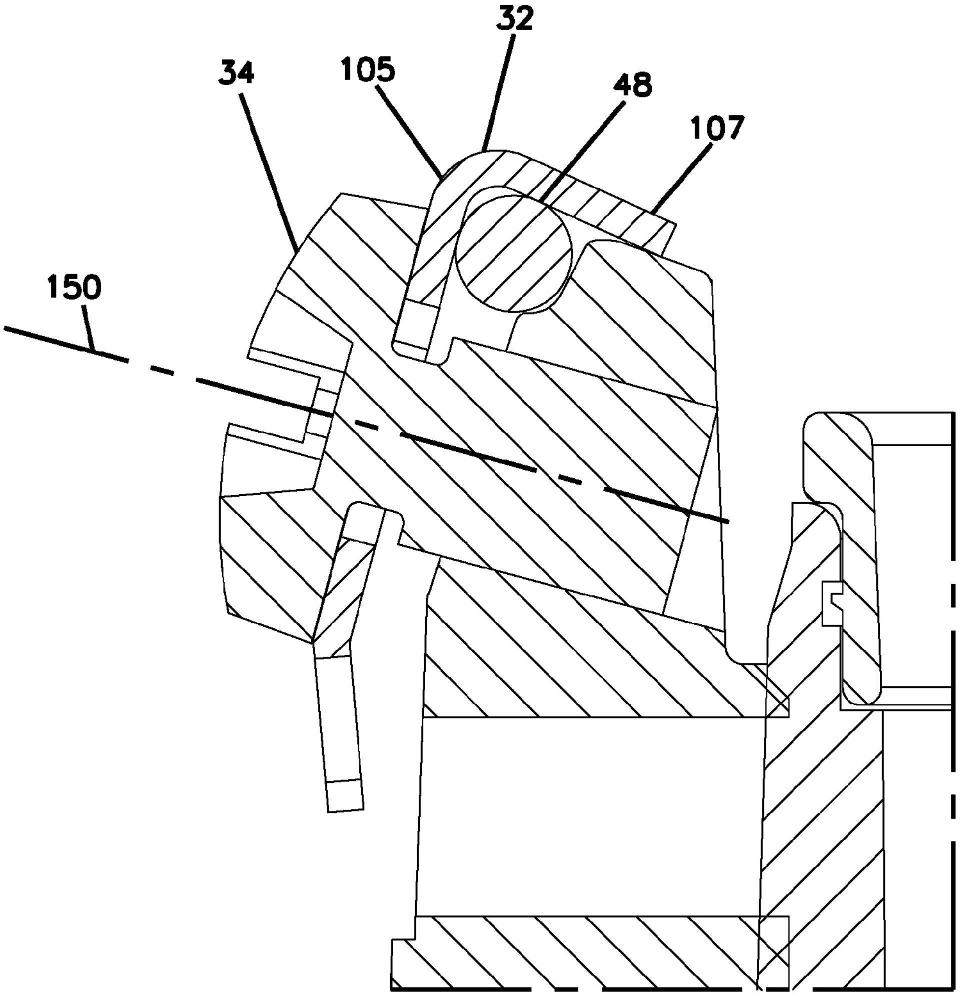
FIG. 21 shows the ground connection location of FIG. 20 retaining a 10-gauge ground wire in the horizontal orientation.
Figure 22:
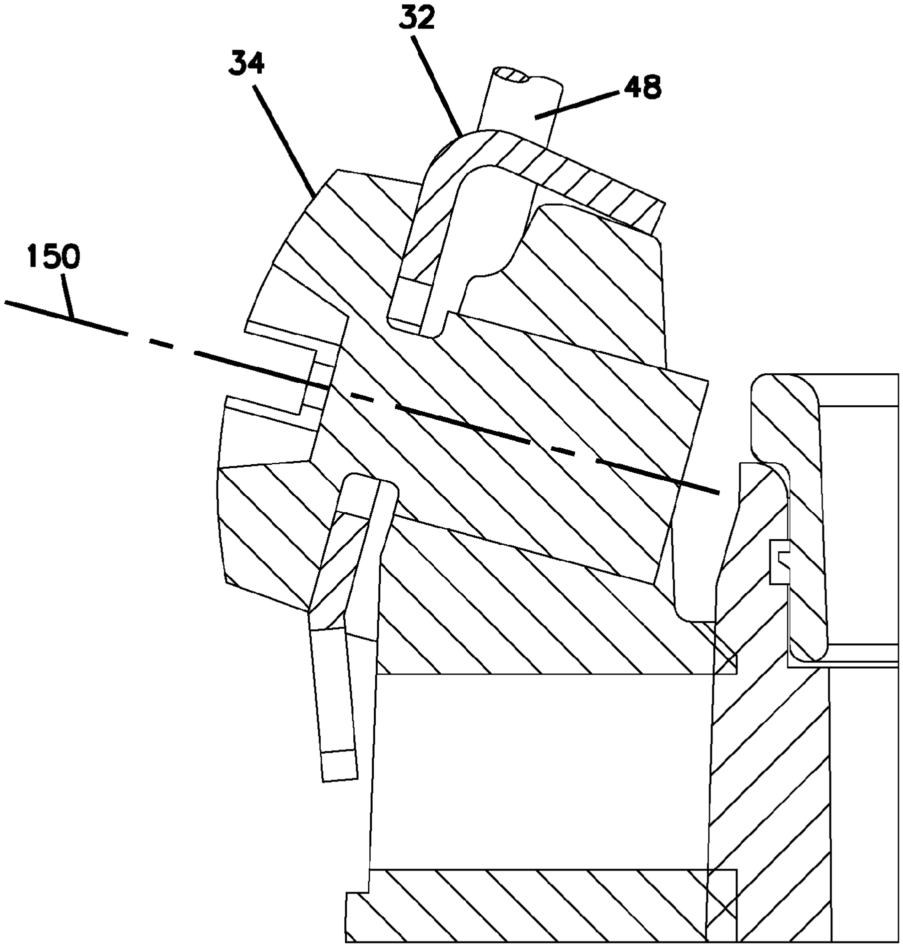
FIG. 22 shows the ground connection location of FIG. 20 retaining a 14-gauge ground wire in a generally vertical orientation.
Figure 23:
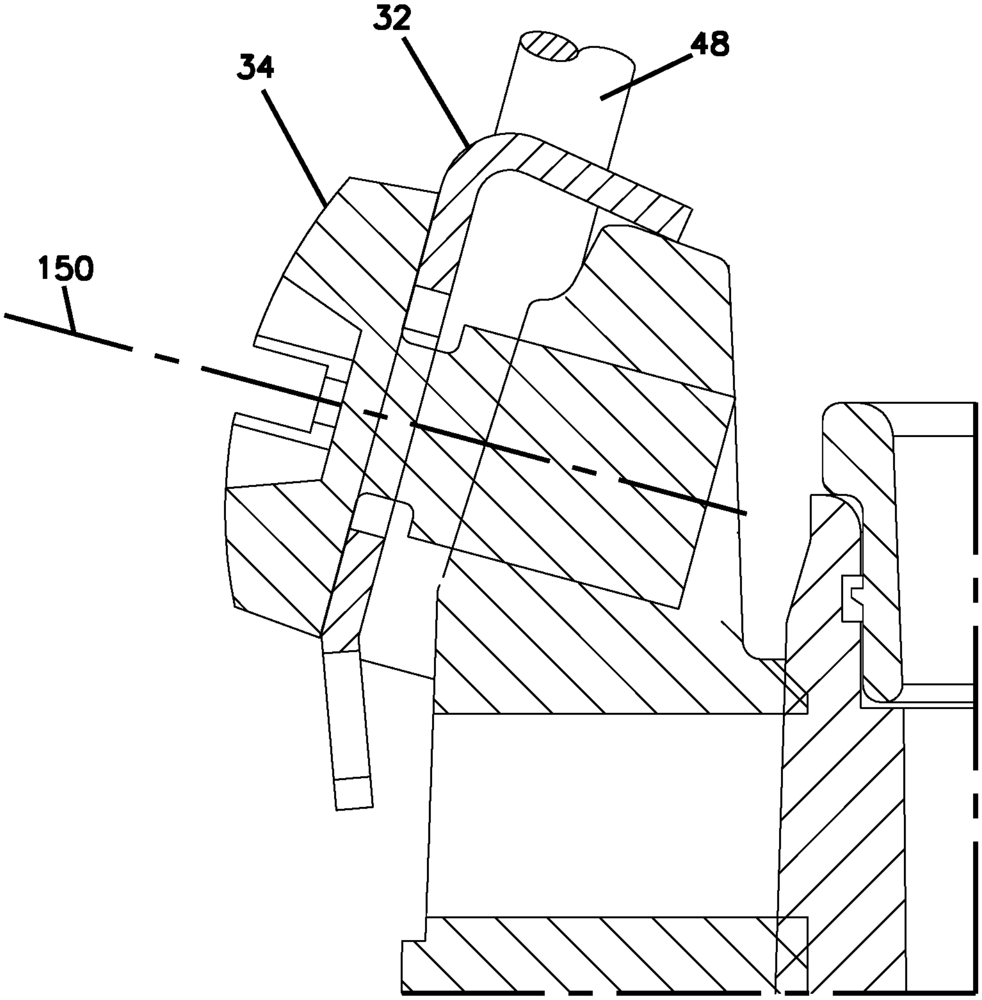
FIG. 23 shows the ground connection location of FIG. 20 securing a 10-gauge ground wire in the generally vertical orientation.
Figure 24:
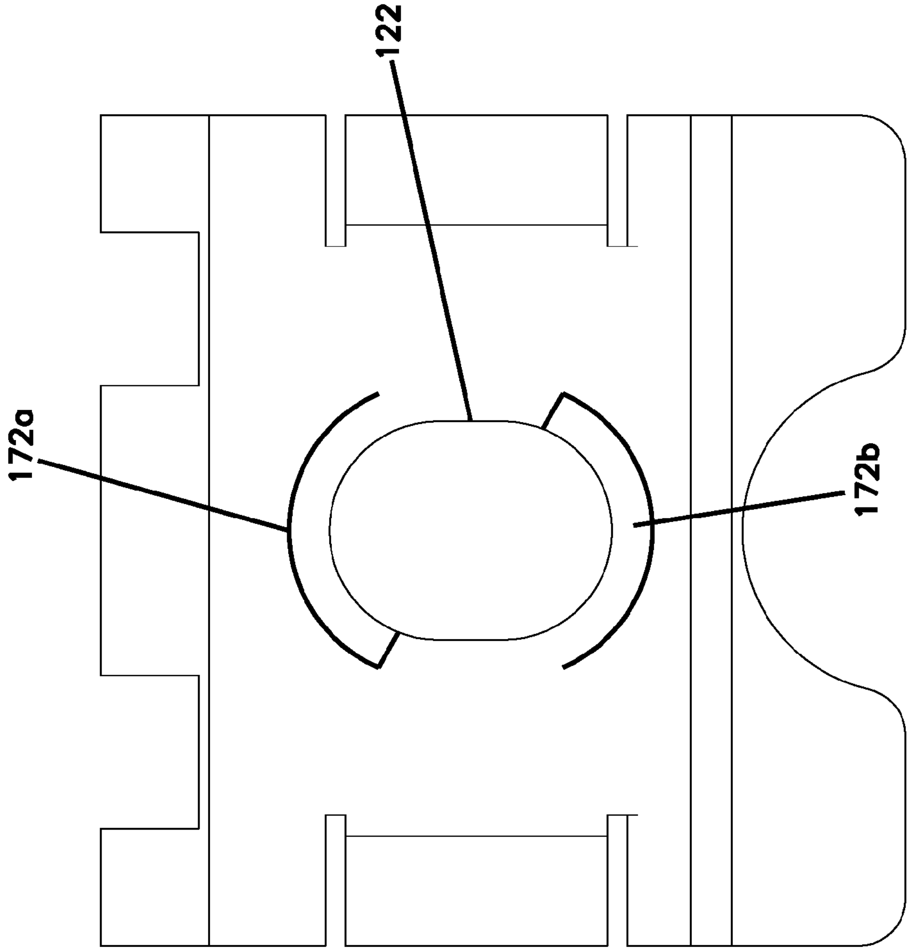
FIG. 24 is a front view of another grounding bracket in accordance with the principles of the present disclosure.

The grounding bracket 34 further includes wire retention tabs 142, 144 that project respectively from the third side 128 and the fourth side 130 of the bracket main body 120. The wire retention tab 142 is configured for securing and retaining a ground wire within linear slot 94 and the wire retention tab 144 is configured for securing and retaining a ground wire within linear slot 96. All of the wire retention tabs have curved portions 105 adapted to oppose their respective linear slots and straight end portions 107 that are configured to overhang their respective linear slots. This type of configuration is adapted for allowing the bracket to accommodate different sized ground wires. For example, FIGS. 20 and 21 show 10 and 14 gauge wires being retained by the grounding bracket 32 within the linear slot 98. Similarly, FIGS. 23 and 24 show 10 and 14 gauge ground wires being retained within the linear slot 94. In certain examples, the back side of the grounding bracket 34 can be textured (e.g., knurled, stamped, coined, dimpled, patterned such as in a cross-hatch, or otherwise roughened) to enhance gripping of the ground wire. Corresponding surfaces on the lock nut can also be similarly textured.

In certain examples, grounding bracket 32 can include an integrated spring element for applying a spring load to the grounding screw 34 along an axis 150 of the grounding screw 34 when the grounding screw 34 is threaded into the grounding screw opening 86 to mount the grounding bracket 32 to one of the ground connection locations 30. In certain examples, the integrated spring element can include at least one cantilever or leaf spring having a base end unitarily connected with the main body 120 of the grounding bracket 32. In certain examples, the grounding screw 34 can include a threaded shaft 152 and a screw head 154, and the spring or springs can be compressed between the screw head 154 and a face of the ground connection location 30 (e.g., angled face 108) when the grounding screw 34 is threaded into the grounding screw opening 86 to secure the grounding bracket 32 to the ground connection location 30. The spring or springs are configured to flex elastically as the springs are compressed between the screw head and the ground connection location. As the spring or springs flex, axial tension is applied to the grounding screw 34. At least some of the axial tension or axial load is carried by the threaded interface between the threaded shaft 152 of the grounding screw 34 and the internal threads of the grounding screw opening 86. The load carried by the threaded interface increases friction which resists or inhibits the grounding screw 34 from unintentionally unthreading from the grounding screw opening 86.

Figure 13:
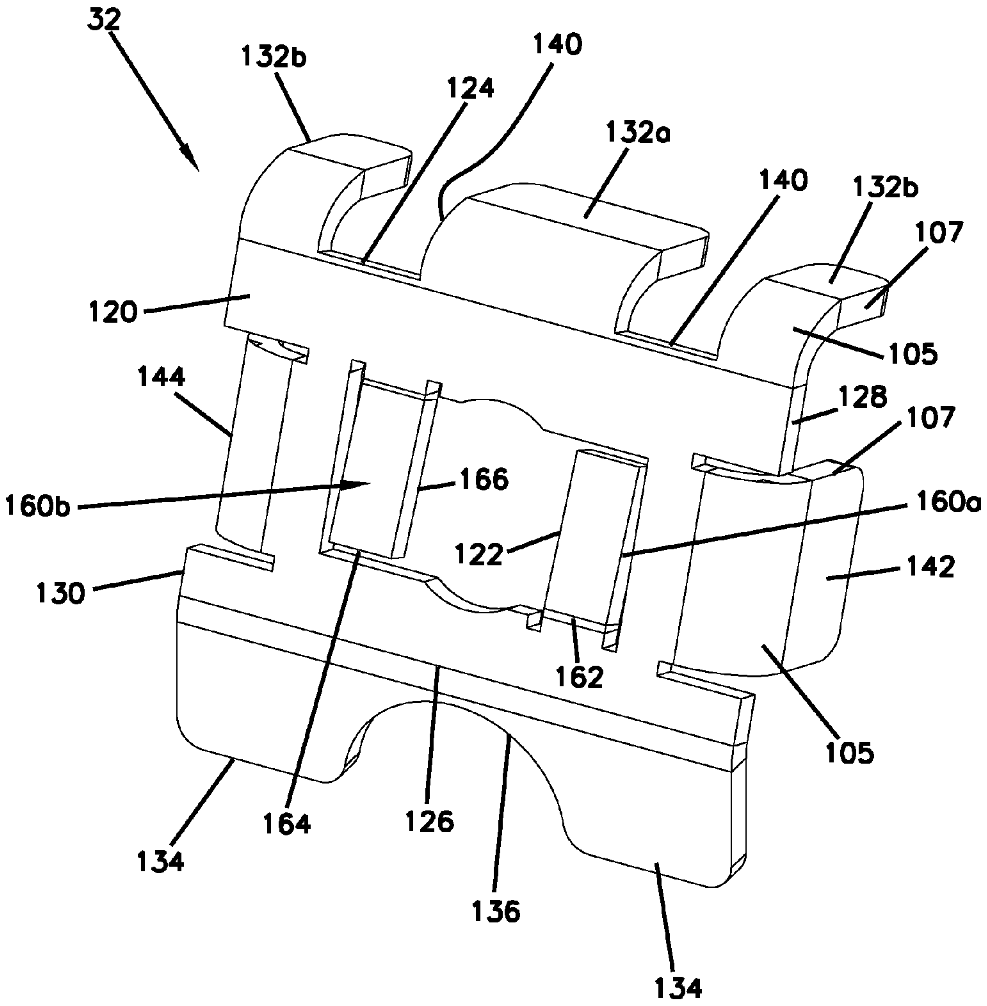
FIG. 13 is a perspective view of a grounding bracket of the conduit coupler of FIGS. 1-5.
Figure 14:
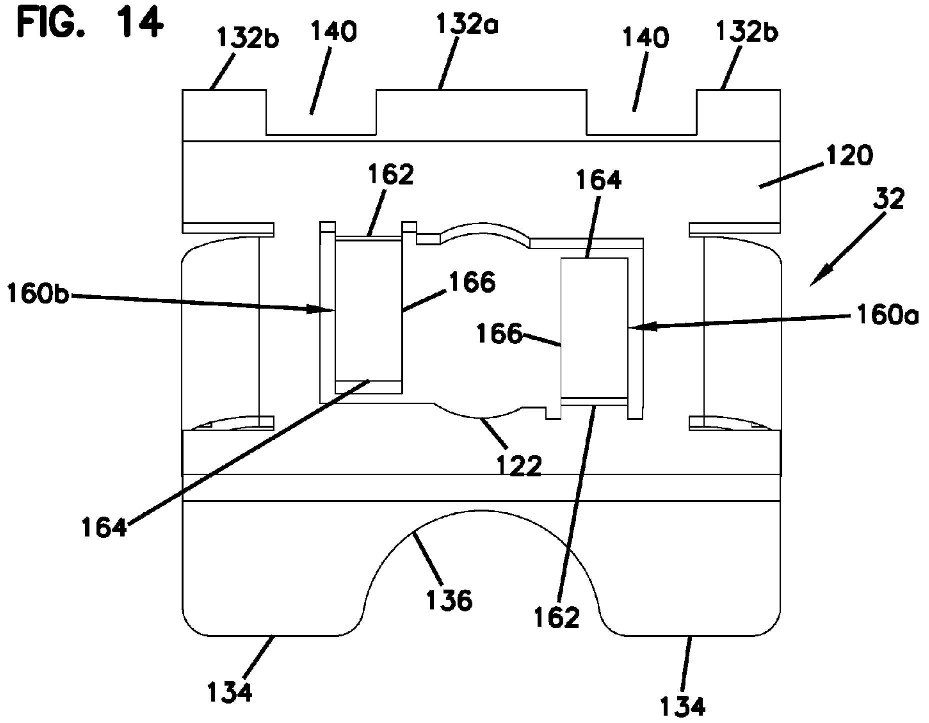
FIG. 14 is a front view of the grounding bracket of FIG. 13.
Figure 15:
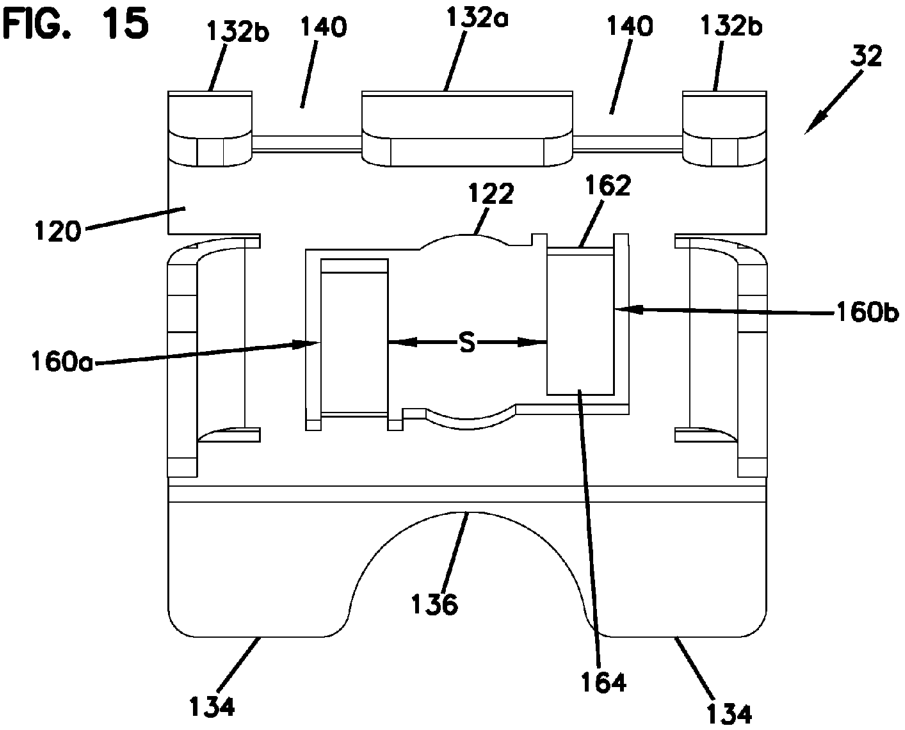
FIG. 15 is a back view of the mounting bracket of FIG. 13.
Figure 16:
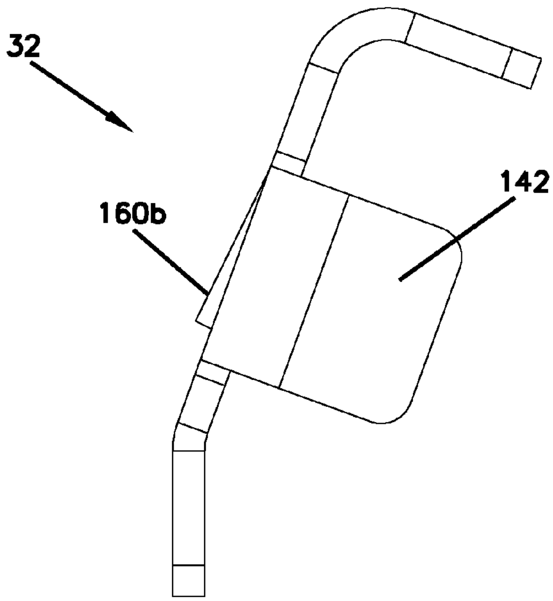
FIG. 16 is a first side view of the mounting bracket of FIG. 13.
Figure 17:
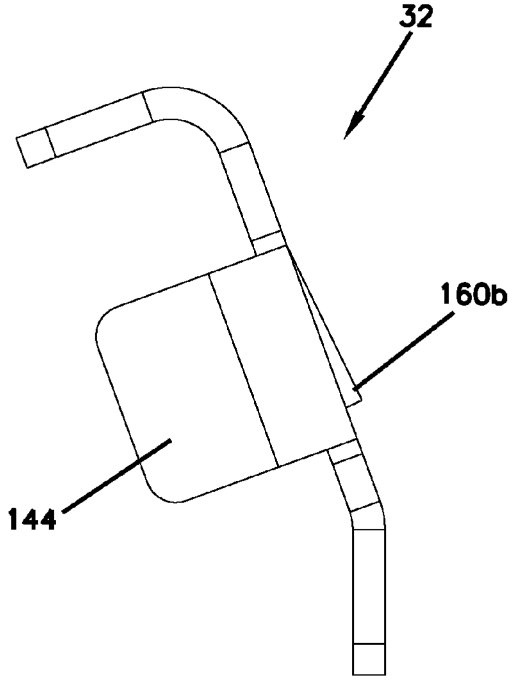
FIG. 17 is a second side view of the mounting bracket of FIG. 13.
Figure 18:
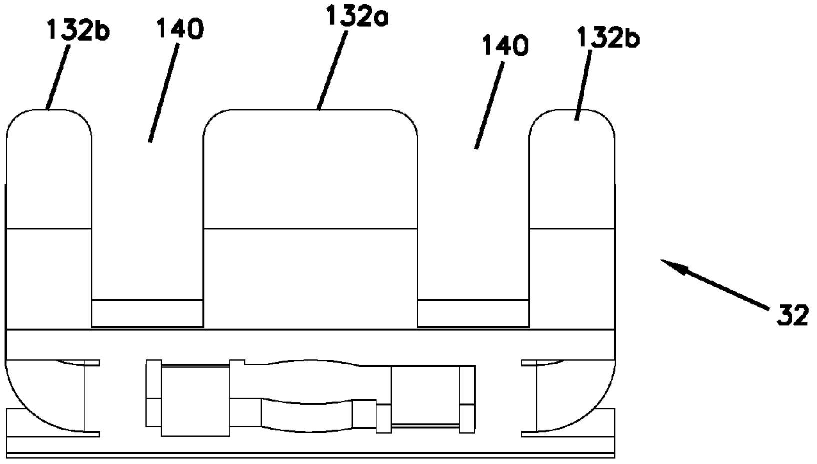
FIG. 18 is a third side view of the mounting bracket of FIG. 13.
Figure 19:
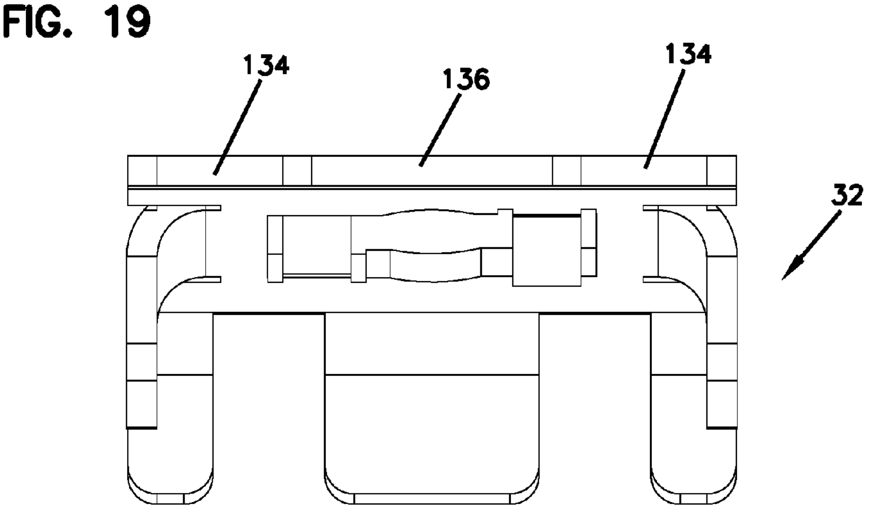
FIG. 19 is a fourth side view of the mounting bracket of FIG. 13.

Referring to FIG. 13, the grounding bracket 32 includes two cantilever springs 160*a*, 160*b* having base ends 162 integrally formed with the bracket main body 120. The cantilever springs 160 also include free ends 164 and sides 166 that extend between the base ends 162 and the free ends 164. The cantilever springs 160 are angled in opposite directions. For example, cantilever spring 160*a* angles in a first direction away from the bracket body toward the ground connection location 30 when the grounding bracket 32 is mounted at the ground connection location 30. In contrast, cantilever spring 160*b* angles in a second direction away from the bracket body toward the screw head 154. Inner sides 166 of the cantilever springs 160*a*, 160*b* define portions of the screw pass-through opening 122. A spacing S (see FIG. 15) between the inner sides 166 of the cantilever springs 160*a*, 160*b* is preferably less than an outer diameter defined by the threads on the shaft 152 of the grounding screw 34. The grounding screw 34 can define a capture slot 170 (see FIG. 20) positioned between the screw head 154 and the threaded portion of the threaded shaft 152. As shown at FIG. 20, the grounding screw shaft 152 passes through the screw pass-through opening 122 of the grounding bracket 32 and the grounding bracket 32 is captured at the capture slot 170 between the screw head 154 and the threaded portion of the threaded shaft 152. In this way, the grounding bracket 32 is captive relative to the grounding screw 34 to minimize the likelihood of loss and to facilitate the ground wire termination process.

Figure 25:
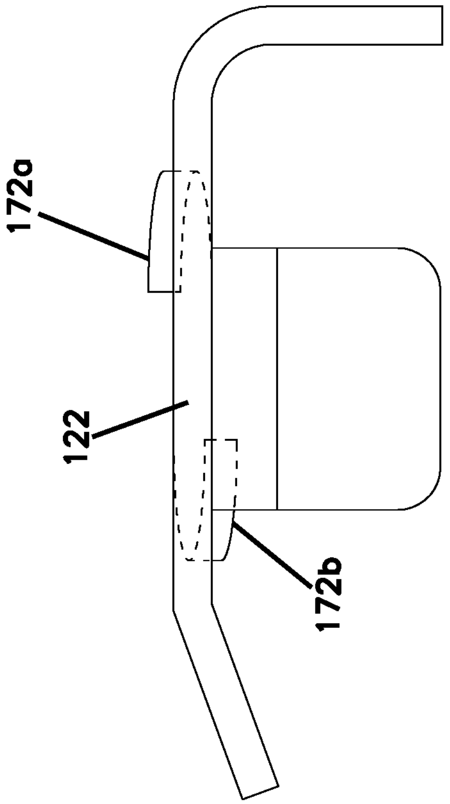
FIG. 25 is a side view of the grounding bracket of FIG. 24.

It will be appreciated that cantilever springs in accordance with the principles of the present disclosure can have a variety of different types of configurations. For example, FIGS. 24 and 25 show an example grounding bracket having cantilever springs 172*a*, 172*b* that curve around the screw pass-through opening 122 in a helical arrangement. One of the cantilever springs 170*b* angles downwardly from the main body of the bracket as it curves along a helix while the other cantilever spring 170*a* angles upwardly from the main body of the bracket as it curves along a helix.

Figure 26:
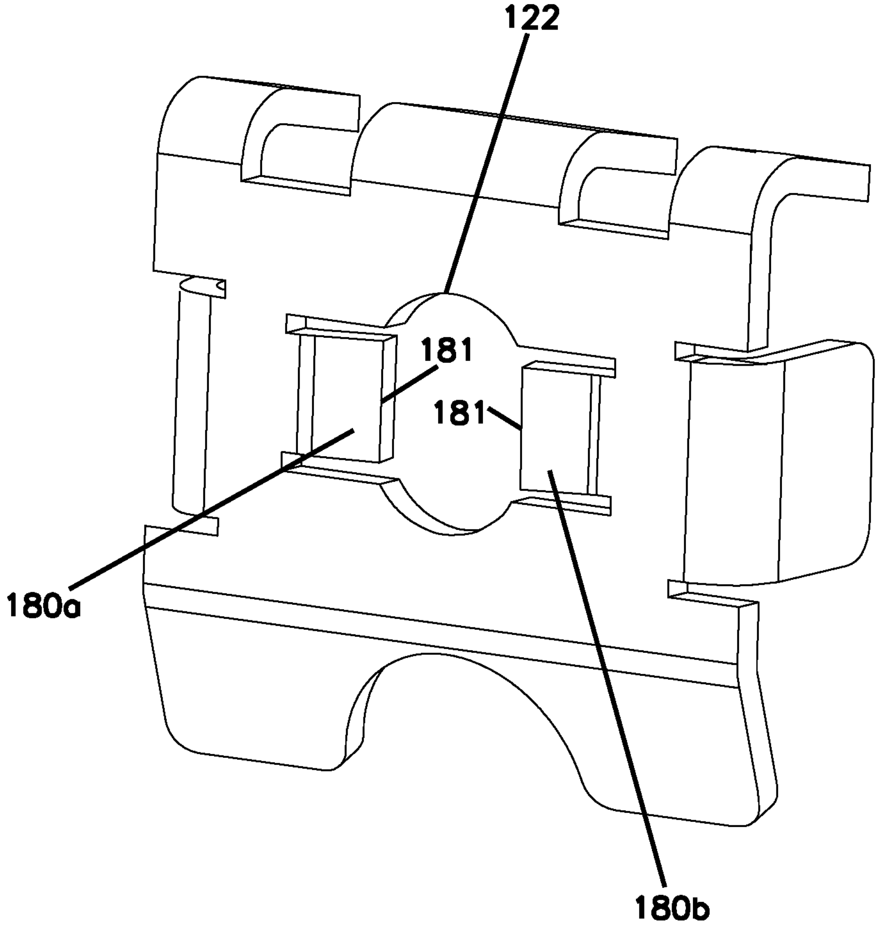
FIG. 26 is a perspective view of a further grounding bracket in accordance with the principles of the present disclosure.
Figure 27:
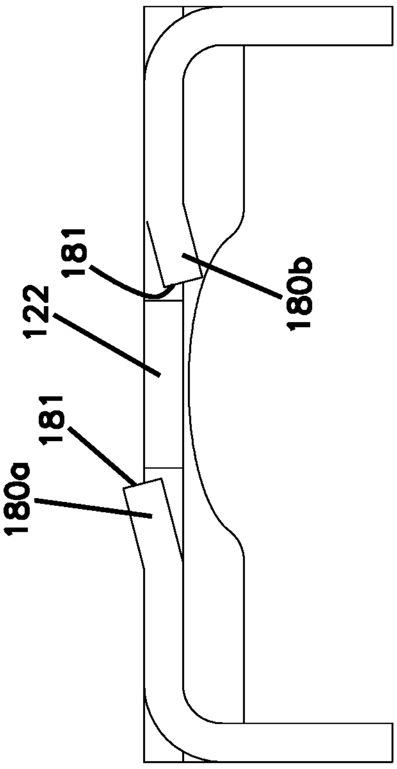
FIG. 27 is a side view of the grounding bracket of FIG. 26.

FIGS. 26 and 27 show an example grounding bracket having cantilever springs 180*a*, 180*a* having opposing free ends 181 that cooperate to define portions of the screw pass-through opening 122 of the bracket. The cantilever 180*a* angles upwardly from the main body of the bracket while the cantilever 180*b* angles downwardly from the main body of the bracket.

FIGS. 30-34 depict another example conduit coupler 220 in accordance with the principles of the present disclosure. The conduit coupler 220 includes a hub 222 and a lock nut 224 adapted to thread onto the hub 222. A liner 28, such as the liner 28 of FIG. 1, is mounted to an end of the hub 222 to protect wires, cables, or other media passing through the coupler 220. The liner 28 can be formed of a gentler material than the hub 222 in relation to the wires, cables, or other media. For example, the liner 28 may be formed of plastic and the hub 222 may be formed of metal.

The lock nut 224 of the conduit coupler 220 includes a plurality of ground connection locations 226 (e.g., three are depicted) that can be provided on grounding towers 228 spaced about a circumference of the lock nut 224. The lock nut 224 defines a central opening 230 (see FIG. 31) that extends through a lock nut main body 232 (see FIG. 31) along a lock nut axis 234 from a first end 236 of the lock nut main body 232 to a second end 238 of the lock nut main body 232. The grounding towers 228 are spaced uniformly about the lock nut axis 234 and are separated from one another by circumferential gaps. Each of the grounding towers 228 has a base end 240 integral with the lock nut main body 232 and a free end portion 242 that extends axially beyond the second end 238 of the lock nut main body 232.

The conduit coupler 220 can have the same construction as the conduit coupler 20, except the grounding towers 228 have an overall height $H_1$ (see FIG. 32) that is reduced compared with the grounding towers 102 of the lock nut 24 shown in FIGS. 1-11 and set screw openings 244 are offset relative to the grounding towers 228. The set screw openings 244 are adapted to receive set screws for locking the lock nut 224 in position relative to the hub 222. In certain implementations, the grounding towers 228 are sufficiently short that the liner 28 projects past the top of the grounding towers 228 (e.g., see FIG. 30).

An advantage of having shorter grounding towers 228 is the ability to limit any interference of the wires with the grounding towers 228 as the wires are pulled through the hub 222. As such, the risk of causing wire damage can be reduced. Wires, cables, or other media extending through the conduit coupler 20 can engage the liner 28 without engaging any of the grounding towers 228. For example, if the wire, cable, or other media is pulled or pushed through the conduit coupler 220 at an angle (e.g., a right angle) to the hub axis (see axis 234), the wire, cable, or other media can slide over the liner 28 (instead of the hub) while remaining spaced from the grounding towers 228. Accordingly, the higher position of the liner 28 as compared to the grounding towers 228 protects the cables from rubbing across the grounding towers 228. The shorter grounding towers 228 can also provide for easier access without risking wire damage.

Typically, the height $H_1$ of the grounding towers 228 is at least 0.25 in (inches), although variations are possible. Often, the dimension of height $H_1$ is at least 0.5 in, although alternatives are possible. Usually, the dimension of height $H_1$ is no more than 1 in, although variations are possible. Alternatively, the dimension of height $H_1$ is within a range of 0.2 in to 0.8 in, although alternatives are possible.

Details of the lock nut 224 will be explained further with reference to FIGS. 31-34. The lock nut 224 can have similar structure, design, features and/or advantages as the lock nut 24 described above with reference to FIGS. 1-11. For the sake of brevity, only those portions of the example lock nut 224 that differ from the lock nut 24 illustrated in FIGS. 1-11 discussed above will be described in detail.

The ground connection locations 226 each include a single grounding screw opening 246 that is internally threaded and sized to receive a grounding screw. Thus, grounding screws can be threaded into the grounding screw openings 246 as needed to secure ground wires to the ground connection locations 226. It will be appreciated that typically only one of the ground connection locations 226 will be utilized for grounding for a given installation. However, the provision of at least three on connection locations 226 provides enhanced access (e.g., essentially 360° access). As depicted, the set screw openings 244 are offset relative to the grounding screw openings 246.

Figure 32:
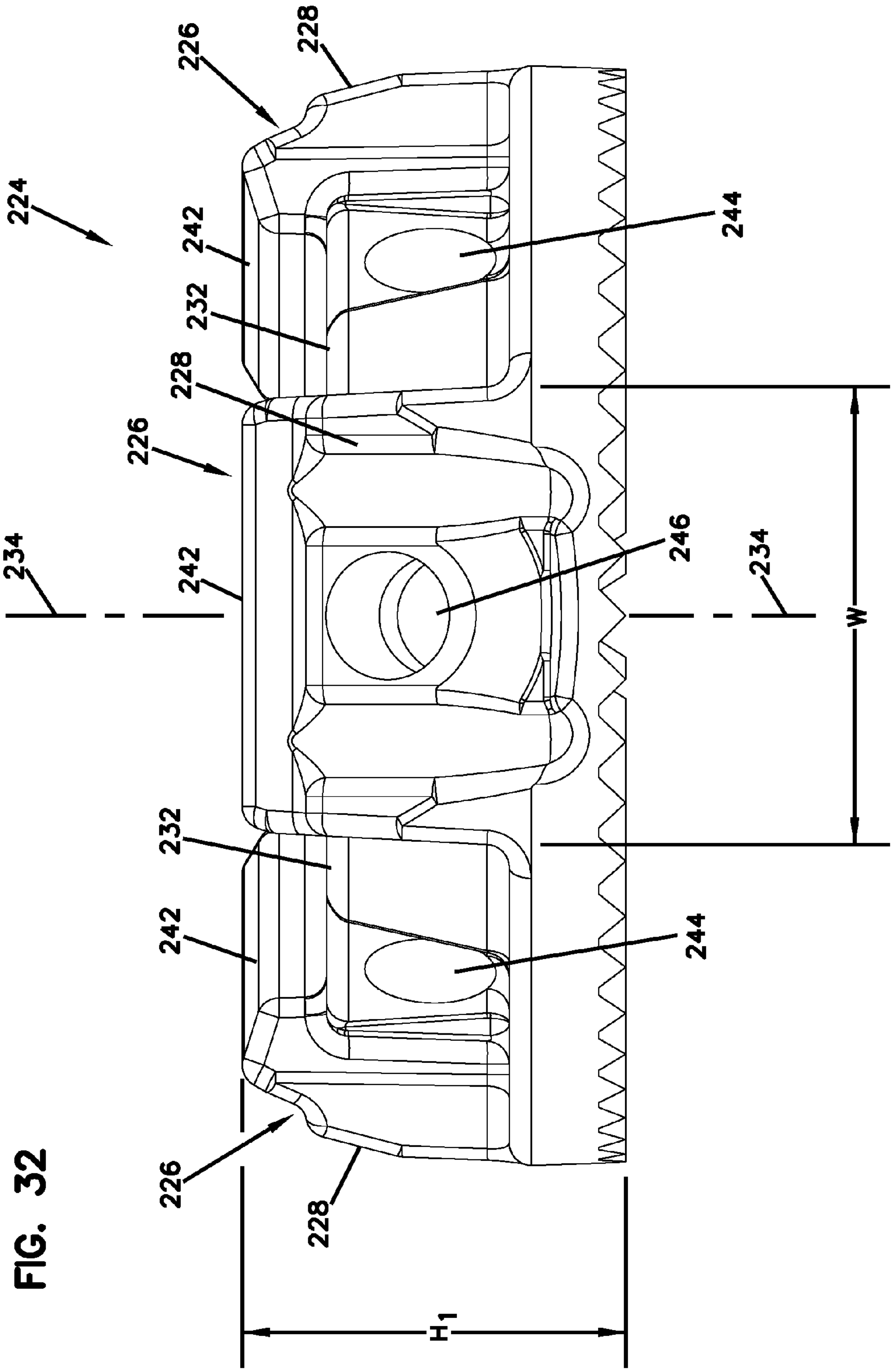
FIG. 32 is a first side view of the lock nut of FIG. 31.
Figure 33:
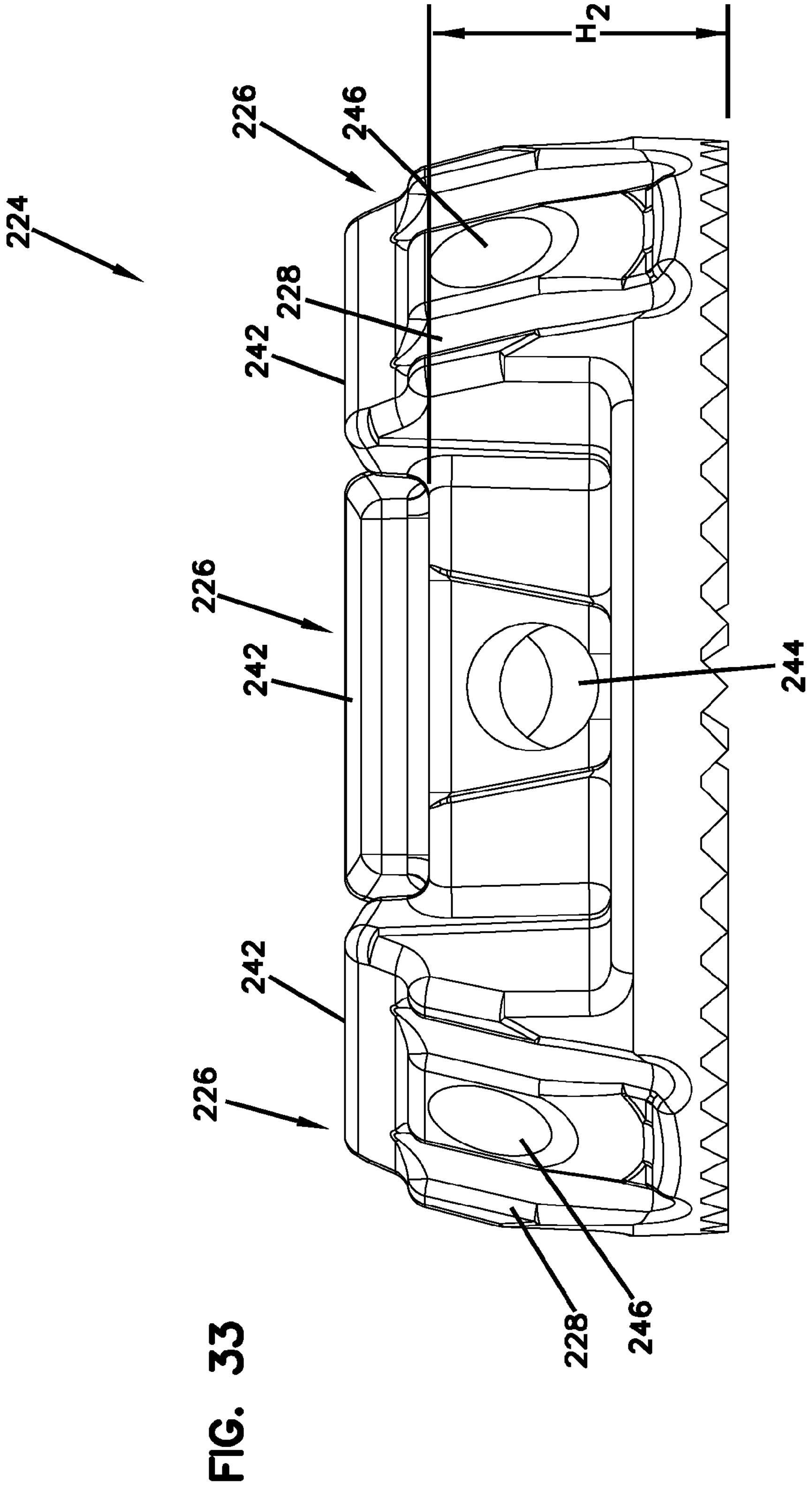
FIG. 33 is a second side view of the lock nut of FIG. 31.
Figure 34:
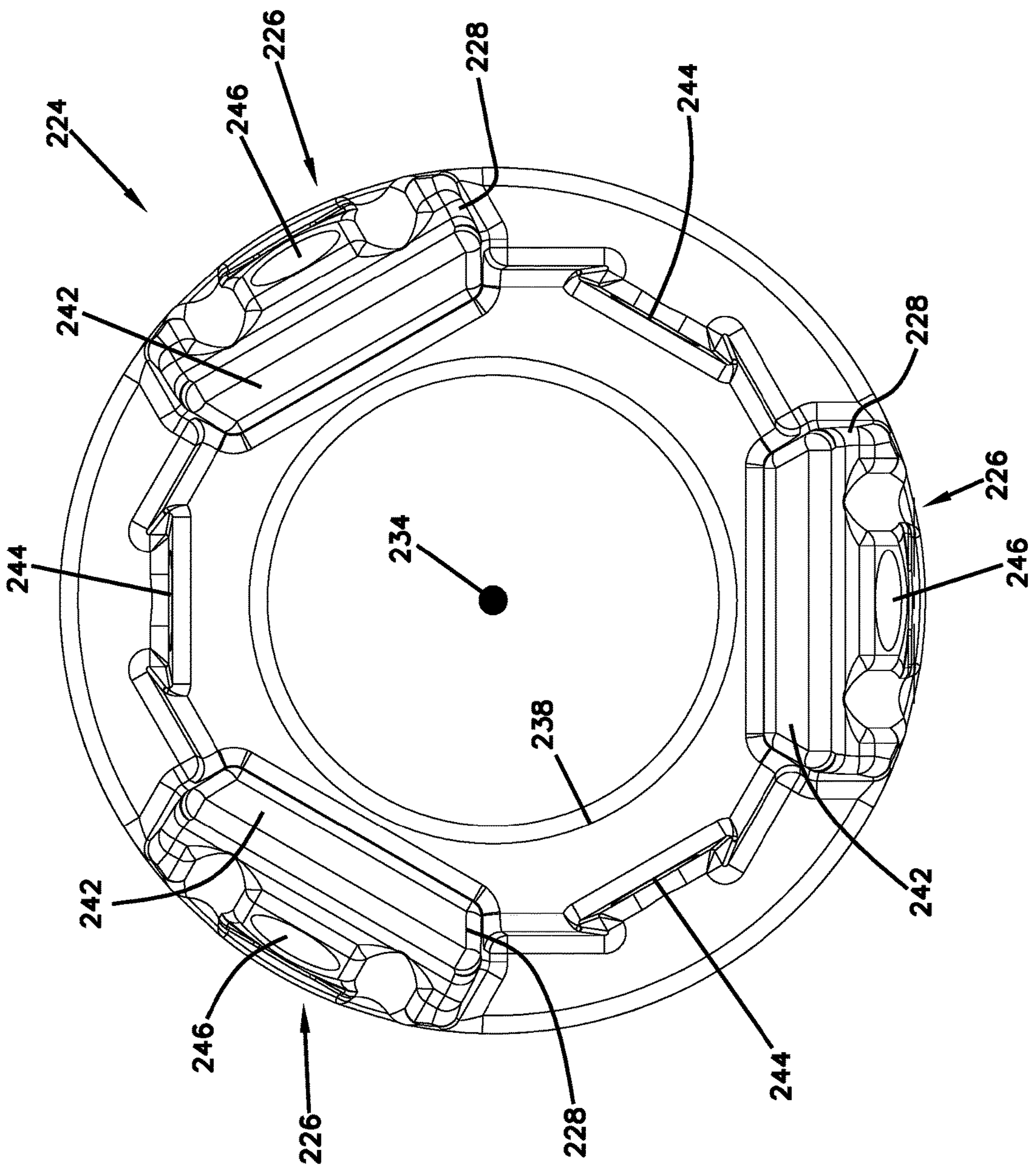
FIG. 34 is an end view of the lock nut of FIG. 31.

Referring to FIG. 32, the height $H_1$ of each one of the grounding towers 228 can extend along the lock nut axis 234 and each one of the grounding towers 228 has a width W that is transverse relative to the lock nut axis 234. In certain examples, the height $H_1$ of the grounding towers 228 is at least 5% taller than a height $H_2$ (see FIG. 33) of the lock nut main body 232, although variations are possible. Usually, the height $H_1$ of the grounding towers 228 is no more than 30% taller than the height $H_2$ of the lock nut main body 232, although variations are possible. Typically, the height $H_1$ of the grounding towers 228 is within a range of 5% to 20%, inclusive, taller than the height $H_2$ of the lock nut main body 232. In certain examples, the grounding towers 228 can extend upwardly above the second end 238 of the lock nut main body 232 by no more than 0.13 inches. In other examples, the grounding towers 228 can extend upwardly above the second end 238 of the lock nut main body 232 within a range of 0.05 inches to 0.1 inches, inclusive, above the second end 238. In some examples, less than 30%, 25%, or 20% of the total height $H_1$ extends above/beyond the second end 238 of the lock nut main body 232.

From the forgoing detailed description, it will be evident that modifications and variations can be made without departing from the spirit and scope of the present disclosure.

What is claimed is:

1. A coupler for attaching a conduit to an enclosure, the coupler comprising:

a hub including a hub main body having a first end and an opposite second end, the hub main body defining a passage that extends through the hub main body along a hub axis from the first end of the hub main body to the second end of the hub main body, the first end of the hub main body defining internal threads adapted to mate with external threads of the conduit, the hub main body defining an externally threaded portion positioned adjacent the second end of the hub main body, the hub also including a hub flange that surrounds the hub axis and projects radially outwardly from the hub main body at an intermediate location between the first and second ends of the hub main body, the hub flange including a hub flange axial end face that faces toward the second end of the hub main body, the hub flange axial end face defining a plurality of gripping structures;

a lock nut adapted to mount on the hub, the lock nut including a lock nut main body having a first end and an opposite second end, the lock nut defining a central opening that extends through the lock nut main body along a lock nut axis from the first end of the lock nut main body to the second end of the lock nut main body, the lock nut main body defining internal threads within the central opening of the lock nut main body, the lock nut also including a ground connection location including a grounding screw opening that is internally threaded, the ground connection location also including at least one linear slot positioned adjacent to the grounding screw opening, the linear slot being configured for receiving a ground wire, the lock nut also including a lock nut flange that surrounds the lock nut axis and projects radially outwardly from the nut main body at a location adjacent to the first end of the lock nut main body, the lock nut flange having a lock nut flange axial end face that faces axially outwardly from the first end of the lock nut main body, the lock nut flange axial end face defining a plurality of gripping structures, wherein when the lock nut is mounted on the hub: a) the lock nut axis is co-axial with the hub axis; b) the externally threaded portion of the main hub body is threaded within the central opening of the lock nut main body; and c) the hub flange axial end face and the lock nut flange axial end face oppose one another;

a grounding bracket that mounts at the ground connection location for securing the ground wire within the linear slot; and a grounding screw that threads within the grounding screw opening of the ground connection location for mounting the grounding bracket to the ground connection location.

2. The coupler of claim 1, wherein the grounding bracket includes an integrated spring element for applying spring pressure to the grounding screw along an axis of the screw when the grounding screw is threaded into the grounding screw opening to mount the grounding bracket to the ground connection location.

3. The coupler of claim 1, wherein the grounding bracket includes a bracket body defining a screw pass-through opening, wherein the grounding screw includes a screw head and a screw shaft, wherein the grounding screw shaft includes a threaded portion and also defines a capture slot positioned between the screw head and the threaded portion, wherein the grounding screw shaft passes through the screw pass-through opening of the grounding bracket and the grounding bracket is captured at the capture slot between the screw head and the threaded portion of the grounding screw shaft so as to be captive relative to the grounding screw, and wherein the threaded portion of the screw shaft threads within the grounding screw opening of the ground connection location.

4. The coupler of claim 1, wherein the grounding bracket includes a bracket body defining a screw pass-through opening, wherein the grounding screw includes a screw head and a screw shaft, wherein the screw shaft passes through the screw pass-through opening and the screw shaft threads into the grounding screw opening of the ground connection location, wherein the grounding bracket is secured between the screw head and the ground connection location of the lock nut, wherein the grounding bracket includes an integrated cantilever spring having a base end integral with the bracket body and a free end, and wherein the integrated cantilever spring flexes when the grounding screw is threaded into the grounding screw opening thereby causing spring load to be applied to the grounding screw along an axis of the grounding screw.

5. The coupler of claim 1, wherein the grounding bracket includes a main bracket body defining a screw pass-through opening through which the grounding screw extends, and wherein the grounding bracket includes at least one wire retention tab that projects from the main bracket body and extends over the linear slot for capturing the ground wire within the linear slot.

6. The coupler of claim 1, wherein the linear slot has a length that extends generally along the lock nut axis.

7. The coupler of claim 1, wherein the linear slot has a length that extends generally transversely relative to the lock nut axis.

8. The coupler of claim 1, wherein the linear slot is a first linear slot having a length that extends generally along the lock nut axis, and wherein the ground connection location includes a second linear slot having a length that extends generally transversely relative to the lock nut axis.

9. The coupler of claim 1, wherein the ground connection location includes a grounding tower having a base end portion integral with the lock nut main body and a free end portion that extends axially beyond the second end of the lock nut main body, wherein the grounding screw opening is defined through the free end portion of the grounding tower, and wherein the linear slot is defined at the free end portion of the grounding tower.

10. The coupler of claim 9, wherein the grounding tower defines a set screw opening that extends through the base end portion of the grounding tower to the central opening of the lock nut.

11. The coupler of claim 9, wherein the ground connection location includes an angled face at the free end portion of the grounding tower, and wherein the grounding screw opening is defined at the angled face.

12. The coupler of claim 9, wherein the lock nut main body defines a set screw opening that extends through the lock nut main body to the central opening of the lock nut, and wherein the set screw opening is offset relative to the grounding tower.

13. The coupler of claim 1, further comprising a liner coupled to the second end of the hub main body, the liner projecting beyond the second end of the hub main body.

14. The coupler of claim 13, wherein the ground connection location includes a grounding tower extending from the lock nut main body, wherein the liner projects higher than the grounding tower.

15. A coupler for attaching a conduit to an enclosure, the coupler comprising:

a hub including a hub main body having a first end and an opposite second end, the hub main body defining a passage that extends through the hub main body along a hub axis from the first end of the hub main body to the second end of the hub main body, the first end of the hub main body defining internal threads adapted to mate with external threads of the conduit, the hub main body defining an externally threaded portion positioned adjacent the second end of the hub main body, the hub also including a hub flange that surrounds the hub axis and projects radially outwardly from the hub main body at an intermediate location between the first and second ends of the hub main body, the hub flange including a hub flange axial end face that faces toward the second end of the hub main body, the hub flange axial end face defining a plurality of gripping structures;

a lock nut adapted to mount on the hub, the lock nut including a lock nut main body having a first end and an opposite second end, the lock nut defining a central opening that extends through the lock nut main body along a lock nut axis from the first end of the lock nut main body to the second end of the lock nut main body, the lock nut main body defining internal threads within the central opening of the lock nut main body, the lock nut also including a ground connection location including a grounding screw opening that is internally threaded, the lock nut also including a lock nut flange that surrounds the lock nut axis and projects radially outwardly from the lock nut main body at a location adjacent to the first end of the lock nut main body, the lock nut flange having a lock nut flange axial end face that faces axially outwardly from the first end of the lock nut main body, the lock nut flange axial end face defining a plurality of gripping structures, wherein when the lock nut is mounted on the hub: a) the lock nut axis is co-axial with the hub axis; b) the externally threaded portion of the main hub body is threaded within the central opening of the lock nut main body; and c) the hub flange axial end face and the lock nut flange axial end face oppose one another;

a grounding bracket that mounts at the ground connection location for securing the ground wire at the ground connection location; and a grounding screw that threads within the grounding screw opening of the ground connection location for mounting the grounding bracket to the ground connection location.

16. The coupler of claim 15, wherein the grounding bracket includes an integrated spring element for applying spring pressure to the grounding screw along an axis of the screw when the grounding screw is threaded into the grounding screw opening to mount the grounding bracket to the ground connection location.

17. A coupler for attaching a conduit to an enclosure, the coupler comprising:

a hub including a hub main body having a first end and an opposite second end, the hub main body defining a passage that extends through the hub main body along a hub axis from the first end of the hub main body to the second end of the hub main body, the first end of the hub main body defining internal threads adapted to mate with external threads of the conduit, the hub main body defining an externally threaded portion positioned adjacent the second end of the hub main body, the hub also including a hub flange that surrounds the hub axis and projects radially outwardly from the hub main body at an intermediate location between the first and second ends of the hub main body, the hub flange including a hub flange axial end face that faces toward the second end of the hub main body, the hub flange axial end face defining a plurality of gripping structures;

a lock nut adapted to mount on the hub, the lock nut including a lock nut main body having a first end and an opposite second end, the lock nut defining a central opening that extends through the lock nut main body along a lock nut axis from the first end of the lock nut main body to the second end of the lock nut main body, the lock nut main body defining internal threads within the central opening of the lock nut main body, the lock nut also including at least three ground connection locations spaced circumferentially about the lock nut axis, each of the ground connection locations including a grounding screw opening that is internally threaded, each of the ground connection locations including a grounding tower having a base end portion integral with the lock nut main body and a free end portion that extends axially beyond the second end of the lock nut main body, the grounding screw opening being defined through the free end portion of the grounding tower, the lock nut also including a lock nut flange that surrounds the lock nut axis and projects radially outwardly from the lock nut main body at a location adjacent to the first end of the lock nut main body, the lock nut flange having a lock nut flange axial end face that faces axially outwardly from the first end of the lock nut main body, the lock nut flange axial end face defining a plurality of gripping structures, wherein when the lock nut is mounted on the hub: a) the lock nut axis is co-axial with the hub axis; b) the externally threaded portion of the main hub body is threaded within the central opening of the lock nut main body; and c) the hub flange axial end face and the lock nut flange axial end face oppose one another;

a grounding bracket that mounts at one of the ground connection locations for securing the ground wire at the grounding location; and a grounding screw that threads within the grounding screw opening of the ground connection location for mounting the grounding bracket to the ground connection location.

18. The coupler of claim 17, wherein the grounding towers each define a set screw opening that extends through the base end portion of the grounding tower to the central opening of the lock nut.

19. The coupler of claim 17, wherein the lock nut main body defines at least three set screw openings that each extend through the lock nut main body to the central opening of the lock nut, and wherein the set screw openings are positioned offset relative to the grounding towers.

20. The coupler of claim 17, further comprising a liner mounted at the second end of the hub main body, the liner projecting beyond the grounding tower.

* * * * *